(12) United States Patent
Theodore et al.

(10) Patent No.: US 9,440,686 B2
(45) Date of Patent: Sep. 13, 2016

(54) FOLDING VEHICLE

(71) Applicants: Ford Global Technologies, LLC, Dearborn, MI (US); Theodore & Associates LLC, Birmingham, MI (US)

(72) Inventors: Chris P. Theodore, Birmingham, MI (US); Christopher David Batty, Bexleyheath (GB); Aaron Matthew Hanson, Lansing, MI (US); Stephen Paul Leu, West Unity, OH (US); Keith Albert Nagara, Commerce, MI (US); Tyler Gregory Rusnak, Saint Charles, IL (US); Gregory VanderVoord, Clarkston, MI (US)

(73) Assignees: FORD GLOBAL TECHNOLOGIES, LLC, Dearborn, MI (US); THEODORE & ASSOCIATES, INC., Birmingham, MI (US)

( * ) Notice: Subject to any disclaimer, the term of this patent is extended or adjusted under 35 U.S.C. 154(b) by 0 days.

(21) Appl. No.: 14/299,567

(22) Filed: Jun. 9, 2014

(65) Prior Publication Data
US 2014/0361515 A1   Dec. 11, 2014

Related U.S. Application Data

(60) Provisional application No. 61/833,554, filed on Jun. 11, 2013.

(51) Int. Cl.
| | |
|---|---|
| *B62B 3/00* | (2006.01) |
| *B62D 31/00* | (2006.01) |
| *B62K 15/00* | (2006.01) |
| *B62B 1/12* | (2006.01) |
| *B62K 13/06* | (2006.01) |

(52) U.S. Cl.
CPC ........... *B62D 31/006* (2013.01); *B62K 15/006* (2013.01); *B62B 1/12* (2013.01); *B62K 13/06* (2013.01)

(58) Field of Classification Search
CPC   B62D 21/186; B62D 31/006; B62K 15/006; B62K 15/00; B62K 15/008; B62K 5/025; B62K 5/01
USPC ........ 180/311, 208; 280/638, 639, 287, 278, 280/87.05; 296/181.7
See application file for complete search history.

(56) References Cited

U.S. PATENT DOCUMENTS

| | | | | |
|---|---|---|---|---|
| 2,488,123 | A | * | 11/1949 | Hartry ........................ 280/638 |
| 3,064,667 | A | | 11/1962 | Marino et al. |
| 3,580,348 | A | * | 5/1971 | Di Blasi .................... 180/208 |
| 3,700,057 | A | * | 10/1972 | Boyd et al. ................ 180/308 |
| 3,710,883 | A | | 1/1973 | Rizzo et al. |

(Continued)

FOREIGN PATENT DOCUMENTS

| | | |
|---|---|---|
| CN | 2825435 Y | 10/2006 |
| EP | 2176117 B1 | 3/2011 |

*Primary Examiner* — James M Dolak
(74) *Attorney, Agent, or Firm* — Frank A. MacKenzie; Bejin Bieneman PLC

(57) ABSTRACT

A folding vehicle structure includes a frame having a plurality of members. A first member intersects a second member at a first pivot point. A third member, spaced from the first and second members, intersects a fourth member, which is also spaced from the first and second members, at a second pivot point. The frame includes a first cross-member extending between the first and second intersection points. The frame is collapsible.

19 Claims, 22 Drawing Sheets

(56) References Cited

U.S. PATENT DOCUMENTS

| | | | |
|---|---|---|---|
| 3,850,472 A * | 11/1974 | Greppi | 296/26.11 |
| 3,990,717 A | 11/1976 | Best et al. | |
| 4,202,561 A | 5/1980 | Yonkers et al. | |
| 4,340,124 A * | 7/1982 | Leonard | 180/208 |
| 4,598,923 A * | 7/1986 | Csizmadia | 280/287 |
| 4,844,109 A | 7/1989 | Navarro et al. | |
| 4,844,494 A | 7/1989 | Blanchard et al. | |
| 5,305,845 A * | 4/1994 | Van Dooren | A61G 3/065 180/65.1 |
| 5,312,126 A | 5/1994 | Shortt et al. | |
| 5,330,219 A | 7/1994 | Groendal et al. | |
| 5,331,777 A | 7/1994 | Chi-Yuan et al. | |
| 6,032,971 A | 3/2000 | Herder et al. | |
| 6,183,002 B1 * | 2/2001 | Choi et al. | 280/647 |
| 6,425,598 B2 | 7/2002 | Murayama et al. | |
| 6,588,787 B2 | 7/2003 | Ou et al. | |
| 6,595,539 B1 | 7/2003 | Belli et al. | |
| 6,851,498 B1 | 2/2005 | Sauve et al. | |
| 6,979,013 B2 | 12/2005 | Chen | |
| 6,986,522 B2 * | 1/2006 | Sinclair et al. | 280/287 |
| 7,055,842 B1 * | 6/2006 | Lin | 280/278 |
| 7,451,848 B2 * | 11/2008 | Flowers et al. | 180/208 |
| 7,654,356 B2 | 2/2010 | Wu et al. | |
| 7,717,210 B2 * | 5/2010 | Mahy et al. | 180/209 |
| 7,841,610 B2 * | 11/2010 | Wang | 280/208 |
| 7,967,095 B2 * | 6/2011 | Kosco et al. | 180/208 |
| 8,348,294 B1 * | 1/2013 | Moldestad | 280/278 |
| 8,388,006 B2 * | 3/2013 | Wu et al. | 280/287 |
| 8,627,910 B1 * | 1/2014 | Carque | 180/65.1 |
| 8,746,730 B2 * | 6/2014 | Wu et al. | 280/639 |
| 8,820,460 B2 | 9/2014 | Chen et al. | |
| 8,827,284 B2 * | 9/2014 | Walther et al. | 280/87.041 |
| 8,876,128 B2 | 11/2014 | Moldestad et al. | |
| 8,894,088 B2 * | 11/2014 | Lark et al. | 280/639 |
| 9,033,089 B2 | 5/2015 | Theodore et al. | |
| 9,061,725 B1 * | 6/2015 | Nania | B62K 3/005 |
| 9,073,585 B2 * | 7/2015 | Jackson | |
| 9,073,594 B2 | 7/2015 | Sluijter et al. | |
| 9,108,695 B2 * | 8/2015 | Kim et al. | |
| 9,187,145 B2 * | 11/2015 | Priest et al. | |
| 9,199,671 B1 | 12/2015 | Ahn et al. | |
| 9,199,672 B1 | 12/2015 | Ahn et al. | |
| 9,216,776 B2 | 12/2015 | Suh et al. | |
| 9,265,675 B2 * | 2/2016 | Ransenberg | B62K 15/008 |
| 9,284,007 B2 * | 3/2016 | Belenkov | B62B 15/003 |
| 9,302,691 B2 * | 4/2016 | Cheng | B62B 3/02 |
| 9,365,254 B1 * | 6/2016 | Durrett | B62K 13/08 |
| 2005/0077097 A1 | 4/2005 | Kosco et al. | |
| 2008/0116665 A1 * | 5/2008 | Nakaizumi et al. | 280/638 |
| 2009/0289434 A1 * | 11/2009 | Lin | 280/278 |
| 2010/0066053 A1 | 3/2010 | Blasi et al. | |
| 2010/0237582 A1 | 9/2010 | Belenkov et al. | |
| 2010/0301582 A1 | 12/2010 | Tsai et al. | |
| 2011/0193313 A1 | 8/2011 | Yun et al. | |
| 2012/0242059 A1 | 9/2012 | Wu et al. | |
| 2012/0280467 A1 | 11/2012 | Walther et al. | |
| 2013/0140796 A1 | 6/2013 | Hsiao et al. | |
| 2013/0228996 A1 | 9/2013 | Hon et al. | |
| 2014/0125036 A1 | 5/2014 | Wu et al. | |

\* cited by examiner

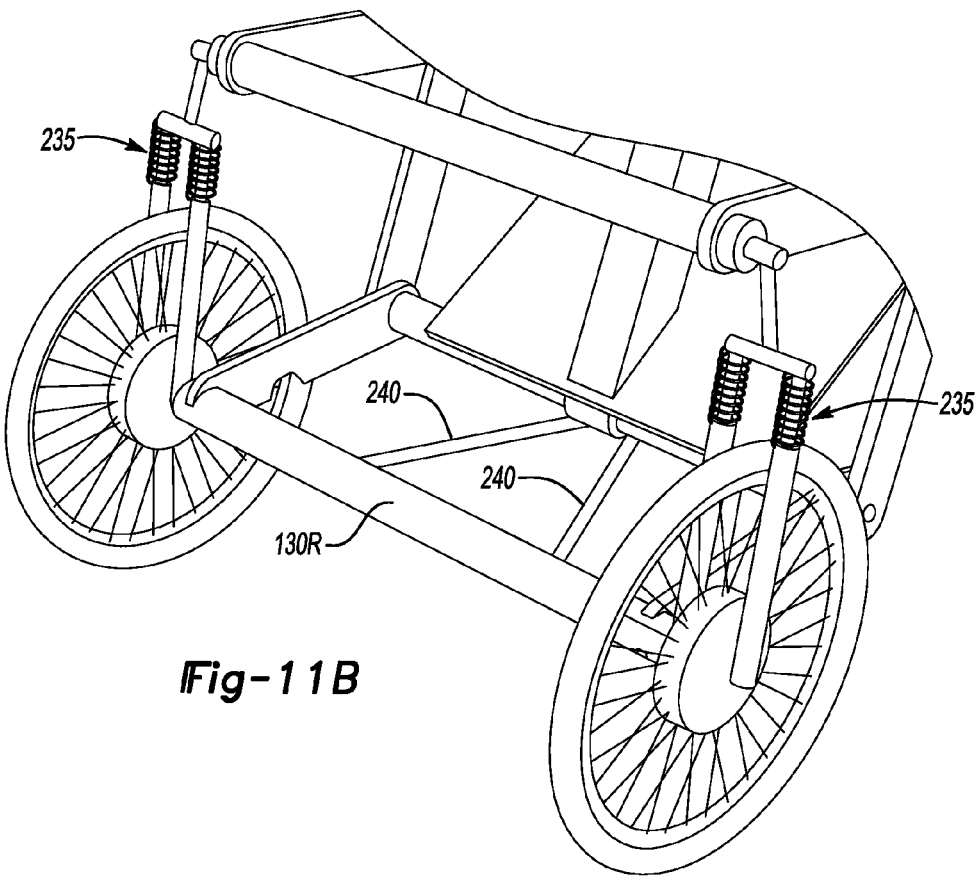
Fig-11B
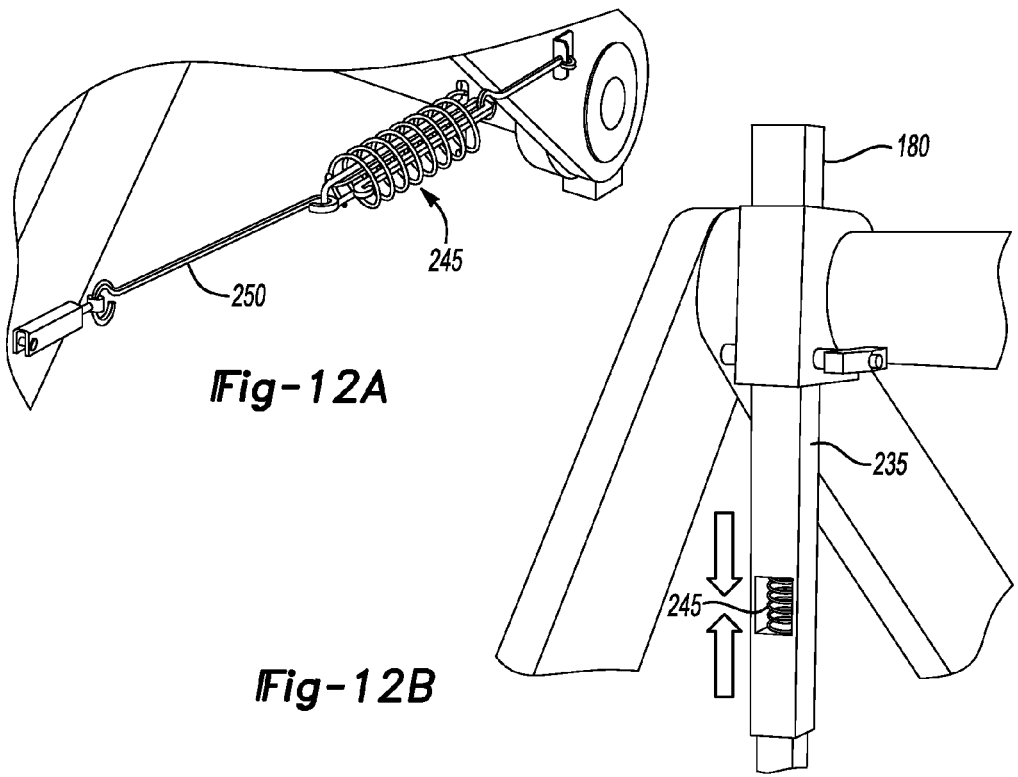
Fig-12A
Fig-12B

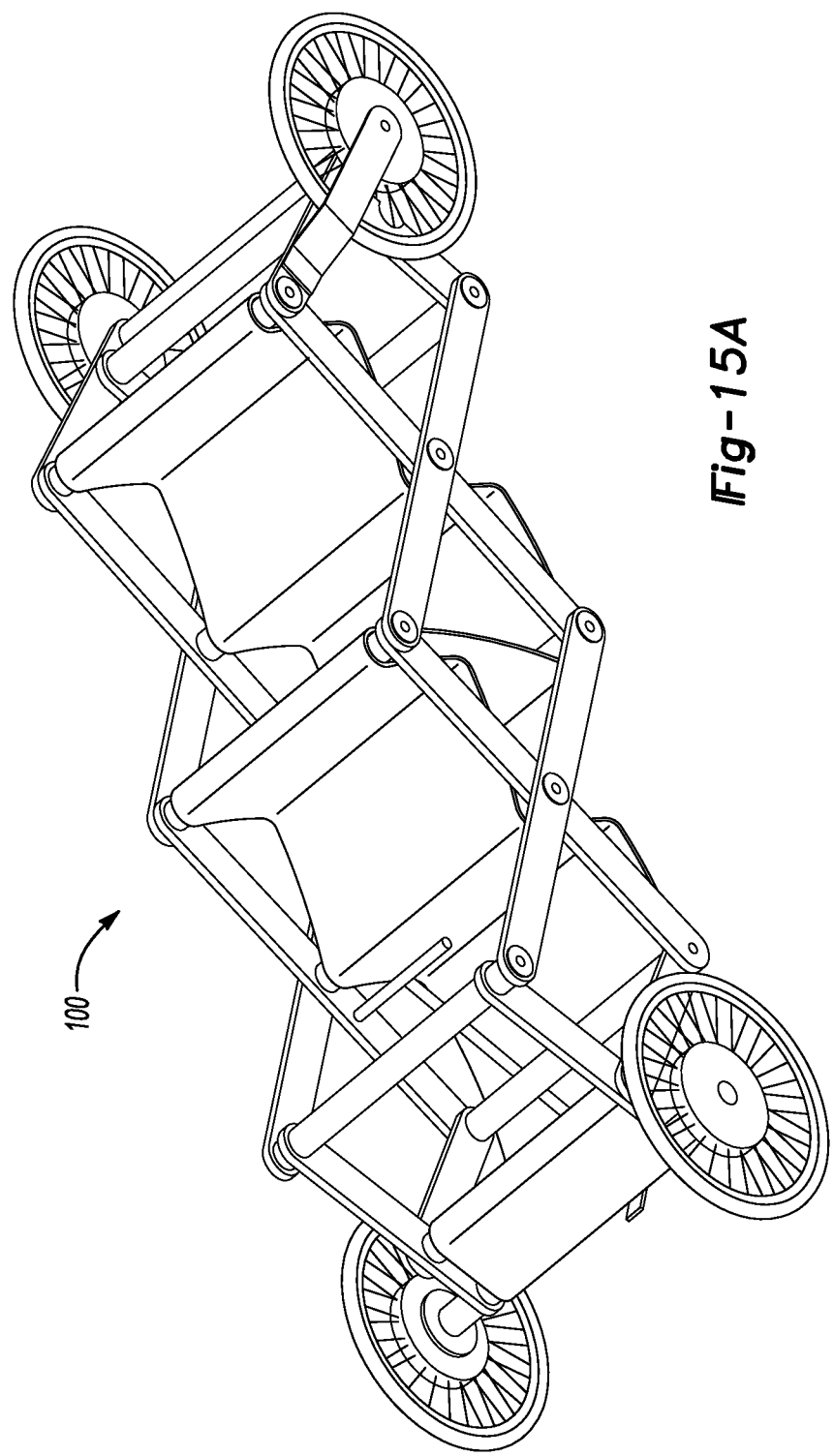

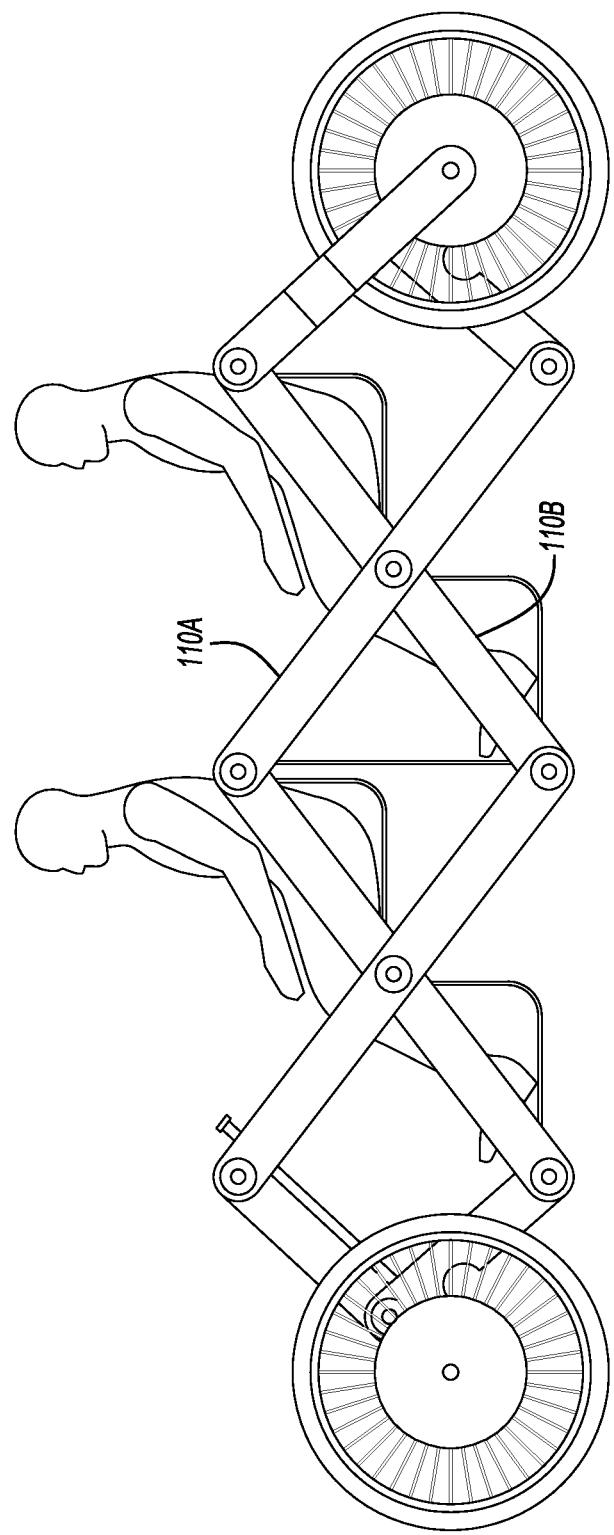

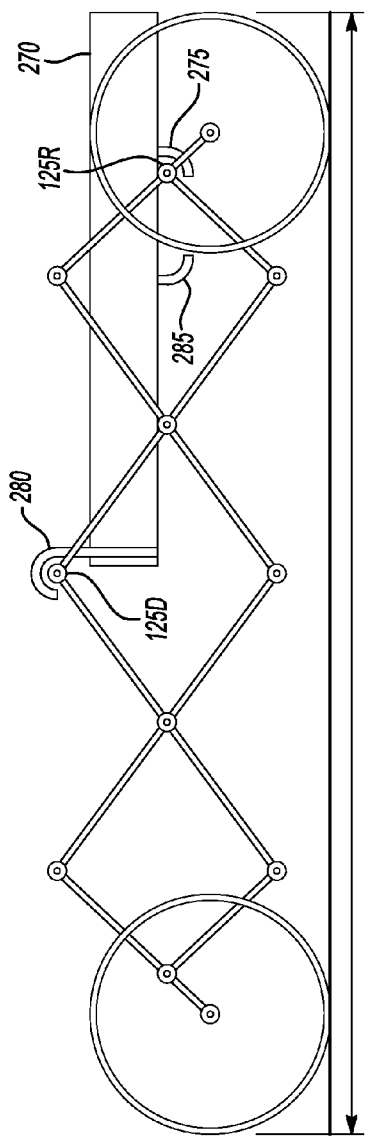
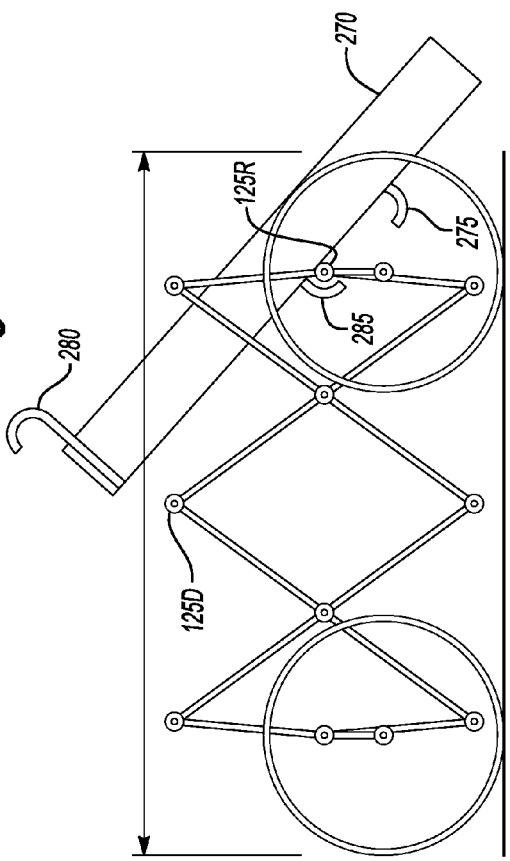

FOLDING VEHICLE

CROSS-REFERENCE TO RELATED APPLICATIONS

This application claims priority to U.S. Provisional Patent Application Ser. No. 61/833,554 filed on Jun. 11, 2013 and titled "ULTRA-LIGHT WEIGHT, LOW COST, FOLDING VEHICLE," the contents of which are hereby incorporated by reference in their entirety.

BACKGROUND

Automotive vehicles have evolved from relatively simple designs in the late 1800s and early 1900s to extremely complex and costly transportation devices in industrialized nations. Tremendous population growth in countries like China and India, and the lack of adequate infrastructure in emerging markets such as Africa, makes transportation using conventional vehicles difficult.

BRIEF DESCRIPTION OF THE DRAWINGS

FIGS. 11A and 11B illustrate views of an example front and rear suspension, respectively.

FIGS. 12A and 12B illustrate a vehicle having an example suspension system with different types of springs.

FIGS. 15A and 15B illustrate a perspective view and a side view of an example 4-passenger vehicle.

FIGS. 17A and 17B are stick diagrams showing an example 4-person vehicle with a pick-up bed in open and closed positions, respectively.

DETAILED DESCRIPTION

Figure 1:
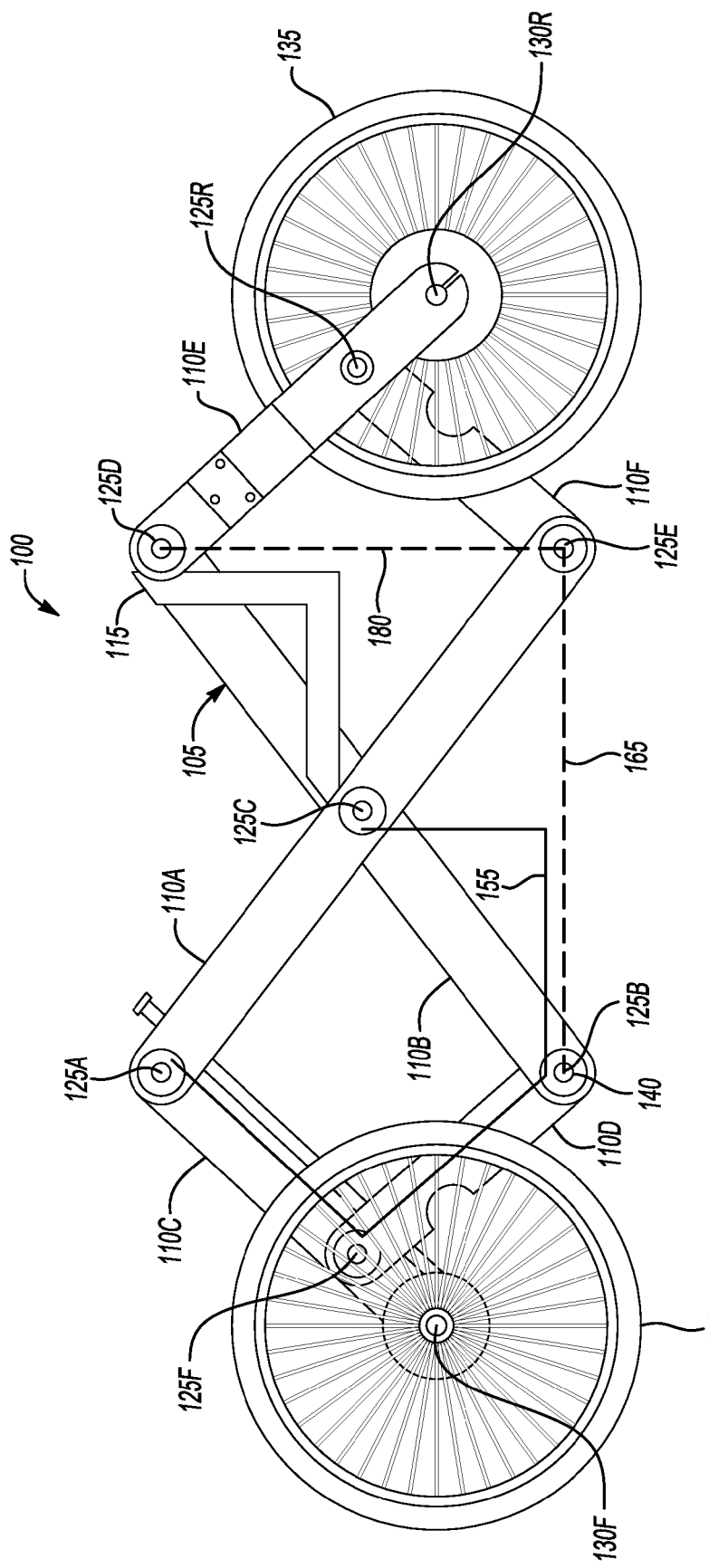
FIG. 1 is a side view of an example 2-passenger vehicle.

A simple, ultra-low cost, commuter vehicle could create a whole new global market, filling the price gap between bicycles and automobiles. One way to develop a low-cost vehicle is to keep the design simple while balancing factors such as meeting the most basic of transportation needs, minimizing weight, and using the fewest possible numbers of parts by having individual components serve multiple functions. Ultra-light weight is also a key consideration in making "zero-emission" electrified vehicles commercially viable. Since the battery is often one of the most expensive parts of an electric vehicle, and battery sizing is primarily determined by vehicle weight; light-weight, low-cost vehicles provide an opportunity for electric vehicles to commercially succeed.

Furthermore, space is at a premium in congested megacities such as those in China and India. Consequently a vehicle that can fold into a smaller footprint when parked is a desirable feature. Moreover, an architecture that is low investment, and can be flexibly configured with minimal change (e.g. 2-passenger, 4-passenger, pick-up, etc.) for varying customer needs, helps create a business case the can profitably support an ultra-low sales price.

An example ultra-light weight, low-cost, folding vehicle is described below. One implementation includes a 4-wheeled lightweight vehicle that uses an X-frame (side-view) structure. The X-members can pivot at a central axis in the side-view, allowing the frame to fold. Lateral tubular cross-members connect the X-members to create the frame, and also provide support for the seats. Horizontal tension beams or cables or vertical compression beams between the ends of the X-members make the frame stiff vertically, yet allow the frame to fold longitudinally when the vehicle is not in use, by either disconnecting the members or allowing the cables to fold. Conversely, when attached, the horizontal members or vertical tension members or cables may limit the ability of the vehicle to fold in front or rear impact or when the floor is loaded vertically. The seats may attach to two cross-members behind the seat back and under the occupant's thighs. The seats can be either rigid or fabric sling seats designed to attach to the vehicle cross-members. The sling seats can also form the floor support. Regardless of the material, the seat design may still allow the vehicle to fold. By adding a tandem X-frame structure, the same basic components can be used to make a 4-passenger vehicle. Cross-member length determines the number of occupants that can sit laterally. Consequently, single passenger, 2-passenger tandem, 2-passenger 2-abreast, 2-row 4-passenger and 2-row 6-passenger 3-abreast models are possible, using the same basic vehicle architecture and many of the same components; and other vehicle model versions are possible.

For example, a 4-passenger model can be converted into a 2-passenger pick-up by the addition of a removable pick-up bed.

The example vehicles described below address various issues relative to introducing mass-market vehicles to emerging markets, large urban areas where space is a premium, or both. The vehicles maximize design simplicity by using only those components required to achieve the desired function and using minimum manufacturing processing, i.e. minimal welding, machining, forming, etc. Several components of the vehicles are designed to perform multiple functions. For example, chassis cross-members can double as the seat structure. The vehicles can further reduce weight by using cables in place of rigid members for key tension loads. The vehicle can further fold into a smaller footprint, minimizing parking and storage space, and, in some instances, "kitted" so that it can be shipped globally in small, high-density packages. In some implementations, the vehicle may be powered electrically or by another fuel source such as gasoline (e.g., via an internal combustion engine). The vehicle may further incorporate various drive mechanisms such as rear wheel drive (RWD), front wheel drive (FWD) or all-wheel drive (AWD). Other features of the vehicle may include a design that localizes masses to minimize weight effect on the chassis structure to synergistically reduce vehicle weight, a modular and scalable design that allows for a number of different models from essentially the same components (1-pass, 1-pass pick-up, 2-pass transverse, 2-pass tandem, 4-pass, 6-pass, 2-pass pick-up, 2 and 4-pass golf carts, ATVs, light tractors, etc.), and the ability to upgrade the vehicle with optional features for more developed markets.

Accordingly, a vehicle is described below that has a simplistic design, both minimizing cost and manufacturing investment, has a reduced weight relative to other vehicles, and has a flexible and scalable architecture. Such a vehicle may be well-suited for rapidly growing countries, like China and India, emerging markets such as various countries in Africa, and urban areas in developed countries. Other potential markets include Neighborhood Electric Vehicles (NEVs) in developed countries, rental vehicles in vacation or resort communities, or the like. The vehicles and components shown in the FIGS. may take many different forms and include multiple and/or alternate components and facilities. The exemplary components illustrated are not intended to be limiting. Indeed, additional or alternative components and/or implementations may be used.

Figure 2:
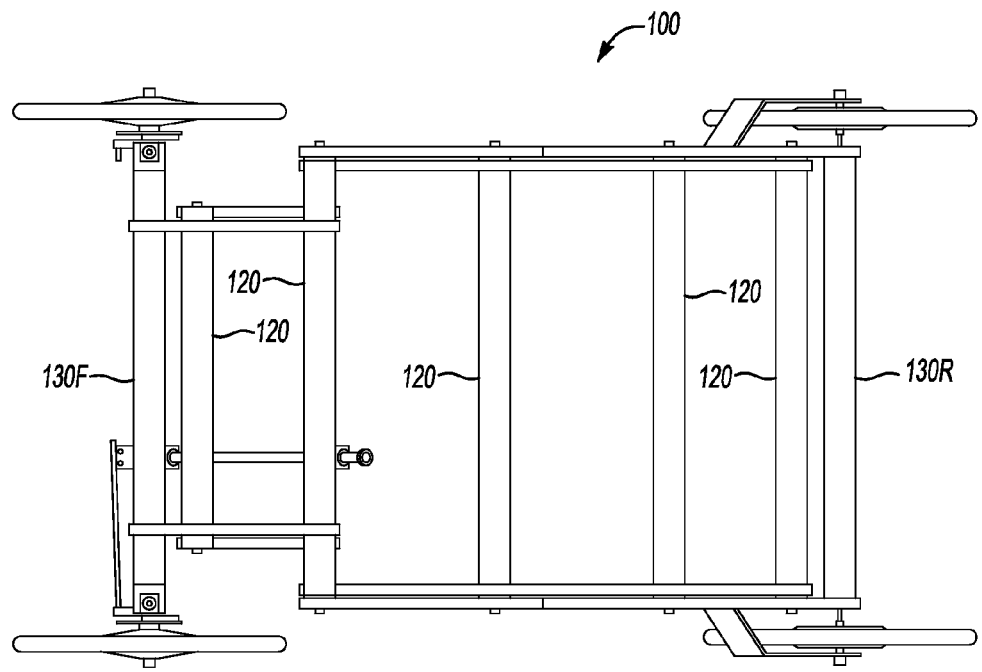
FIG. 2 is a top view of an example 2-passenger vehicle.

Referring to FIGS. 1 and 2, an example 2-passenger folding vehicle 100 includes an X-frame structure 105 configured to pivot at the intersections of the X members 110, a seat 115 that may be attached to a cross-member 120 located at a center of an X pivot 125 (i.e., where two X members 110 intersect) and an upper rear cross-member 120 behind the passenger's shoulders, upper and lower members 110 configured to attach front and rear axles 130 to the vehicle structure 105, a tension cable or detachable horizontal (tension) or vertical (compression) member that controls vehicle 100 extension, and a detachable vertical tension cable, horizontal (compression) or vertical (tension) member that, e.g., prevents the vehicle 100 from folding upon front or rear impact. The vehicle 100, as shown, may be configured to power fold, extend, or both. Further, by setting a brake or parking brake at one end of the vehicle 100, the driven wheels 135 at the other end can be used to actuate the longitudinally folding or extending of the vehicle 100.

The X-member structure 105 may include individual beams 140 connected by a pivot joint at an intersection point. Horizontal axis pivot joints may also located at pivots 125A, 125B, 125D, and 125E. Lateral horizontal cross-members 120 may be configured to connect the corresponding pivots 125 of the X-members as shown in the plan view of FIG. 2. The cross-members 120 between pivots 125F and 125R may be used, e.g., to improve lateral stiffness.

Referring back to FIG. 1, the seat 115 may be attached to the cross-member 120 extending between the pivots 125D located behind the passenger's shoulders and the cross-member 120 extending between the pivots 125C behind the passenger's knees. The seat 115 can be formed from a rigid for flexible material. For instance, the seat 115 may include a fabric sling attached to the cross-members 120. The seat 115 may be removed from the vehicle 100 by, e.g., unlatching the seat 115 or otherwise disconnecting the seat 115 from the cross-members 120. With regard to the sling seat 115, the fabric can be extended forward to form a floor 155 and dash panel by attaching a forward most edge to the cross-member 120 between the pivots 125A, 125F and/or 125B.

Figure 3A:
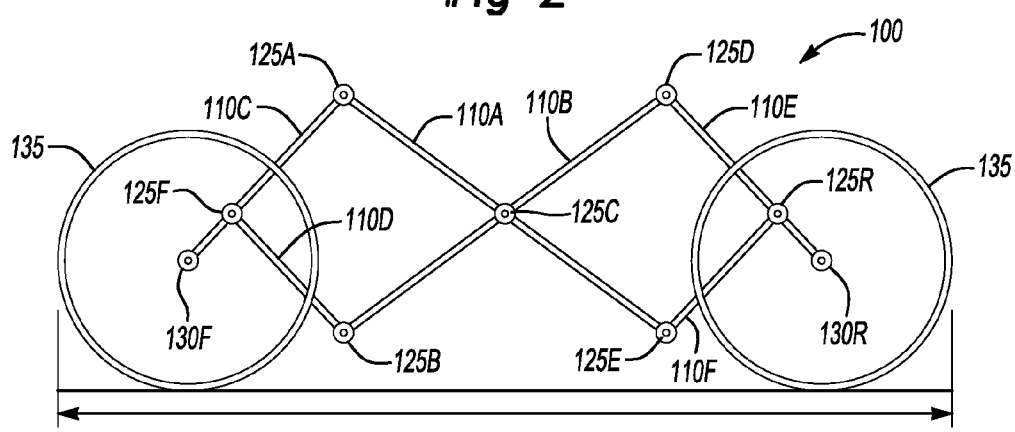
FIGS. 3A and 3B are stick diagrams showing the vehicle of FIGS. 1 and 2 in open and closed positions, respectively, with first linkage lengths.
Figure 3B:
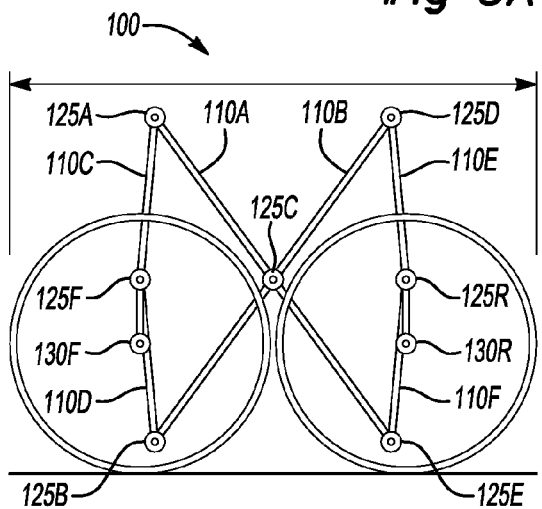
Figure 4A:
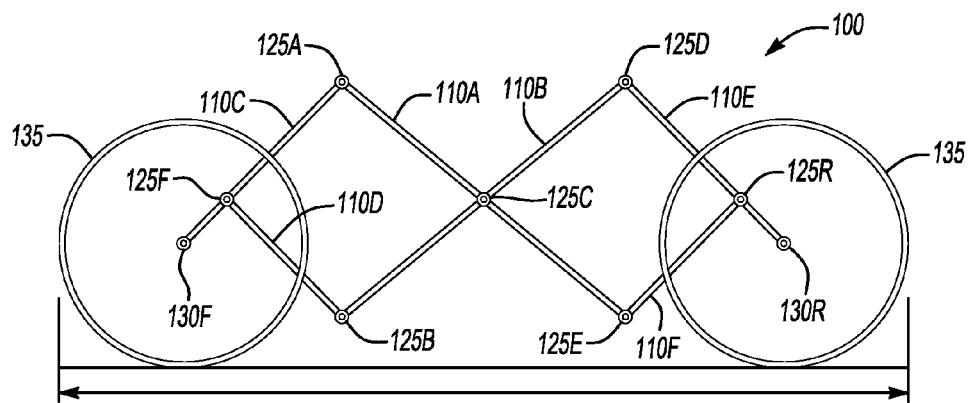
FIGS. 4A and 4B are stick diagrams showing the vehicle of FIGS. 1 and 2 in open and closed positions, respectively, with second linkage lengths.
Figure 4B:
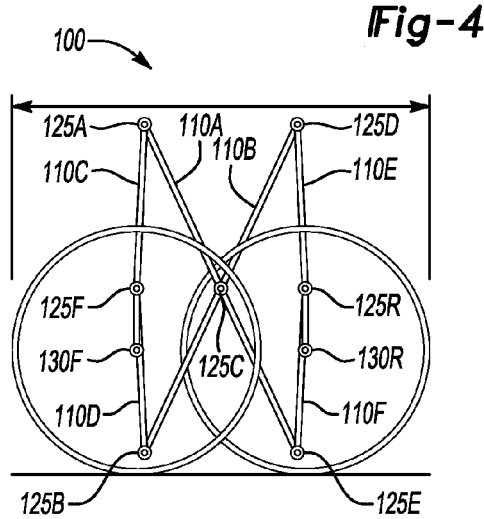

Referring to FIGS. 3A and 3B, the upper front members 110C may be attached to a front axle 130F, and upper rear member 110E may be attached to the rear axle 130. Lower front member 110D and lower rear member 110F may connect to the upper members 110C and 110E through pivots 125F and 125R, respectively. Note that front and rear axle 130 centerlines may be coincident with pivots 125F and 125R. For smaller wheel diameters, however, the upper members 110C and 110E may be extended past the pivots 125F and 125R, as shown, to provide adequate ground clearance to the frame while the vehicle 100 is in the extended position, the folded position, or both. In addition, the lengths of the cross-members 120 and X-members 110 may be adjusted to change the ride height, the length of the vehicle 100 when extended, and the length of the vehicle 100 when folded (see FIG. 4B). At the minimum folded length, shown in FIG. 4B, the front and rear wheels 135 may overlap, requiring different track widths for the front and rear axles 130. A wider front track may provide adequate steer turn angles without excessive vehicle 100 width. Staggered track widths may also allow nesting of folded vehicles, allowing, e.g., approximately five 4-passenger or six 2-passenger folded vehicles to be lined up in a single 20 foot parking space.

Figure 5:
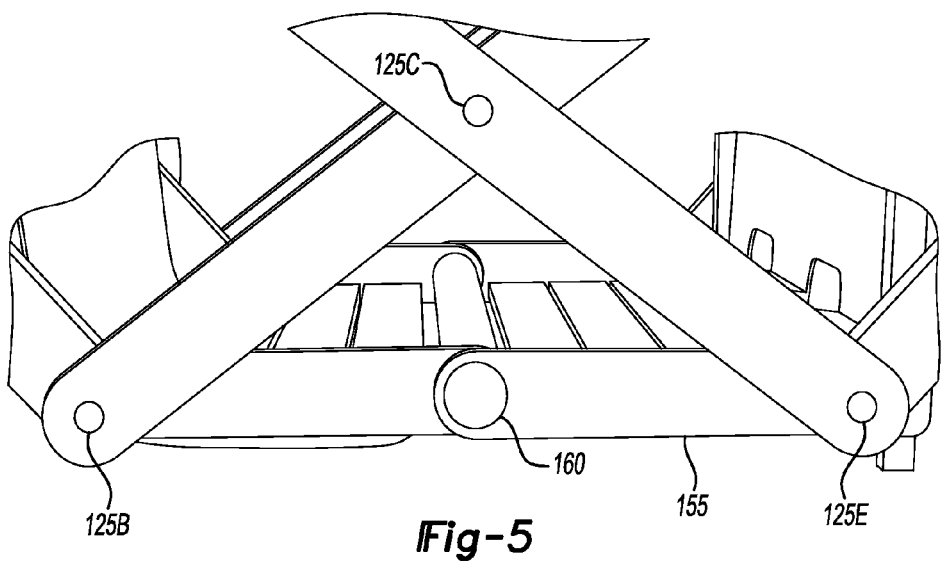
FIG. 5 illustrates an example vehicle having a folding floor.
Figure 6A:
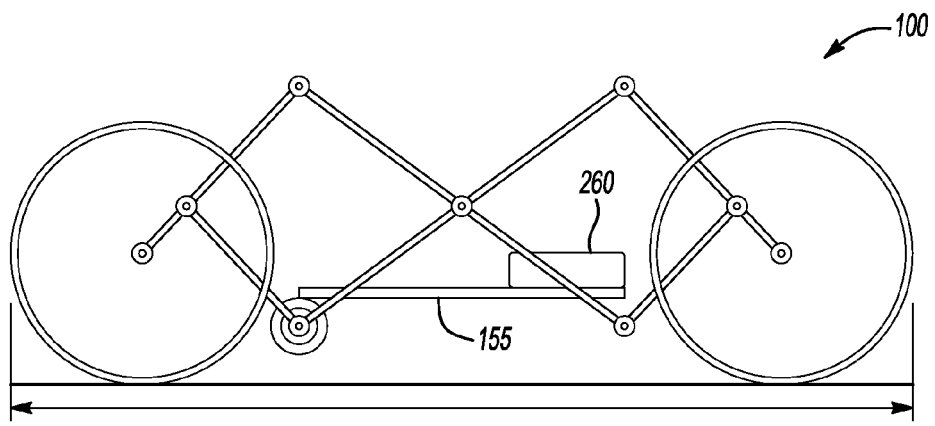
FIGS. 6A and 6B are stick diagrams showing an example vehicle with a sliding floor in open and closed positions, respectively.
Figure 6B:
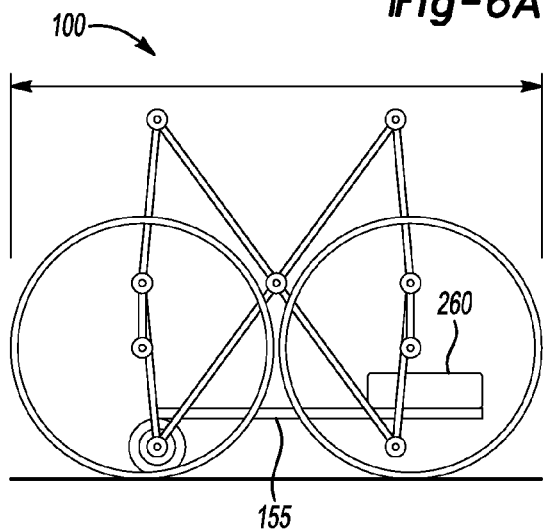

Referring to FIG. 5, options for a floor structure 155 for the vehicle 100 that still allow the vehicle 100 to fold include rigidized fabric (see FIG. 1) draped from the cross-member 120C and attached to the cross-members 120A, 120B, or 120F. Another option may include incorporating a rigid folding floor linkage 160 between pivots 125B and 125E, as shown in FIG. 5. Another possible implementation, shown in FIGS. 6A and 6B, includes using a rigid sliding floor 155 attached to, and configured to pivot about, cross-member 120B or cross-member 120E, and configured to slide along an opposite cross-member 120E or cross-member 120B, respectively, as the vehicle 100 is adjusted to the folded position. Because the floor structure 155 of FIGS. 6A and 6B does not change when the vehicle 100 is folded, the floor structure 155 may act as a mounting surface for one or more batteries 260, providing easy access to the battery 260 for, e.g., removal, charging, or both.

Referring back to FIG. 1, the horizontal tension cable 165 or detachable member may control the extended length of the structure 105 while still allowing the vehicle 100 to be folded longitudinally. The cable or detachable link is shown connecting pivots 125B and 125E, but may also be attached to the corresponding cross-members 120, or the members 110 near the pivots 125. The cable or detachable link can alternatively be located to join any one or more horizontal pivots 125 (such as 125F and 125C, 125C and 125R, or 125A and 125D). To help keep the vehicle 100 in the extended position in a front or rear impact, similar detachable cables or rigid members 180 may be attached to the cross-members 120 or members 110 near the vertical pivots (125A and 125B, or 125D and 125E).

Figure 7A:
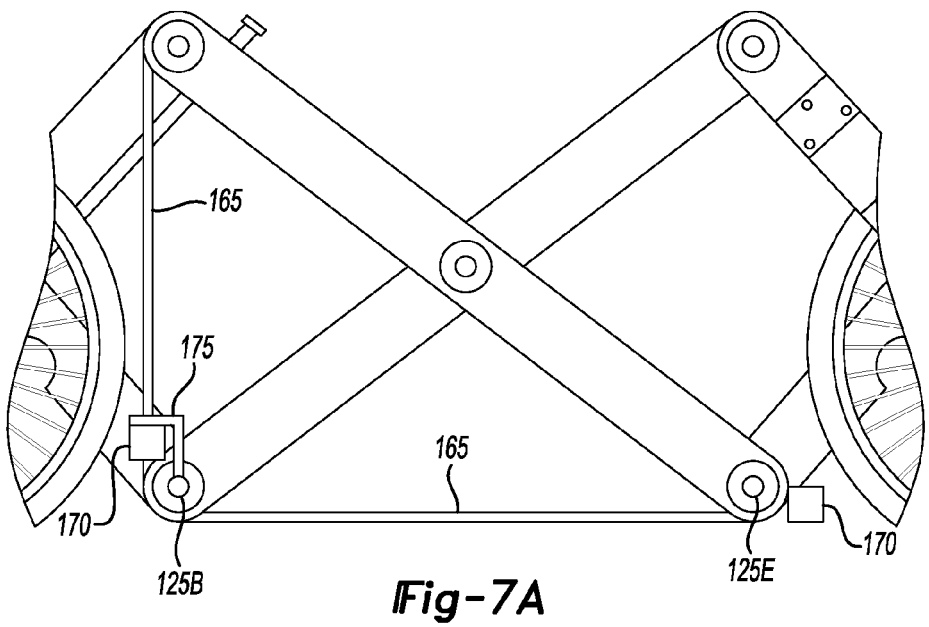
FIGS. 7A and 7B illustrate example latches for securing the vehicle in open and closed positions, respectively.

FIGS. 7A-7D illustrate different ways to stabilize the vehicle 100 when in the extended position and, in some instances, reduce the likelihood that the vehicle 100 will fold following a front or rear impact. A continuous cable 165 is depicted in FIG. 7A. The cable 165 may be routed horizontally between pivots 125B or 125E with the vertical portion routed through or around either pivots 125A or 125D. Two cable stops 170 may control the extended length while a cable latch 175 may be used to lock in the vertical safety portion of the cable 165. The latch may be disengaged to fold the vehicle 100.

Figure 7B:
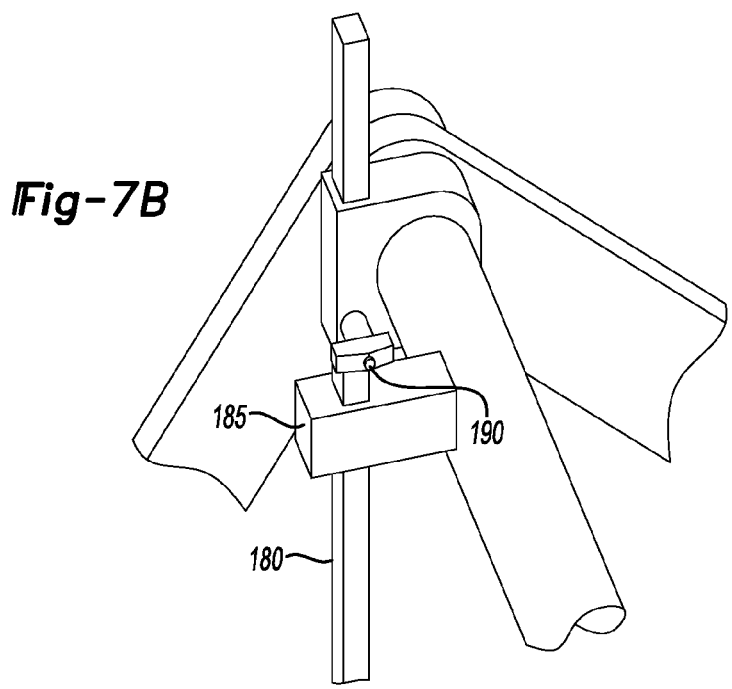

FIG. 7B depicts a latching vertical member 180. The vertical member 180 may be attached between pivots 125A and 125B or 125D and 125E. The vertical member 180 may be configured to slide through the upper attachment at pivot 125A or 125D and rest upon a down stop 185 to control the extended length. The vertical member 180 may be held in place with a safety latch 190 to prevent folding upon front or rear impact. Disengaging the safety latch 190 may allow the vehicle 100 to fold.

Figure 7C:
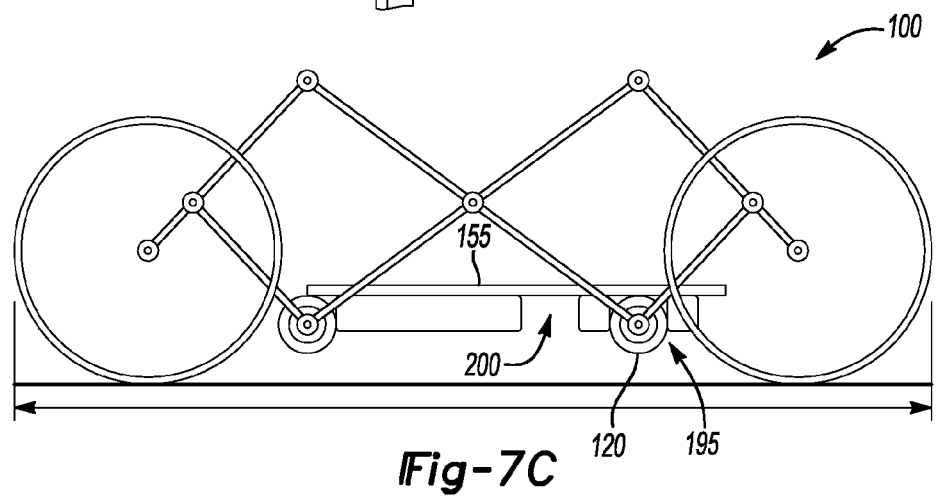
FIGS. 7C and 7D are stick diagrams showing a first example latching mechanism with the vehicle in open and closed positions, respectively.
Figure 7D:
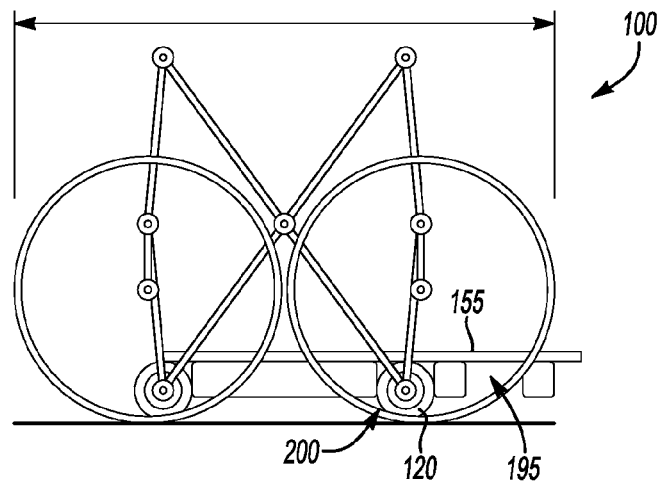

Referring now to FIGS. 7C and 7D, the rigid sliding floor 155 may be modified to simultaneously control the extended position and prevent folding upon front or rear impact. A hasp-type slot 195 may be configured to engage the pivot 125E cross-member 120 to, e.g., control the extended position. When the vehicle 100 is unfolded, the rear axle 130B cross-member 120 may slide into the hasp-type slot 195 in the floor structure 155. An additional slot 200 may be configured to hold the vehicle 100 in the folded position. The operator can lift the rear of the floor 155 to disengage the slots 195, 200, so that the vehicle 100 can be extended or folded.

Figure 7E:
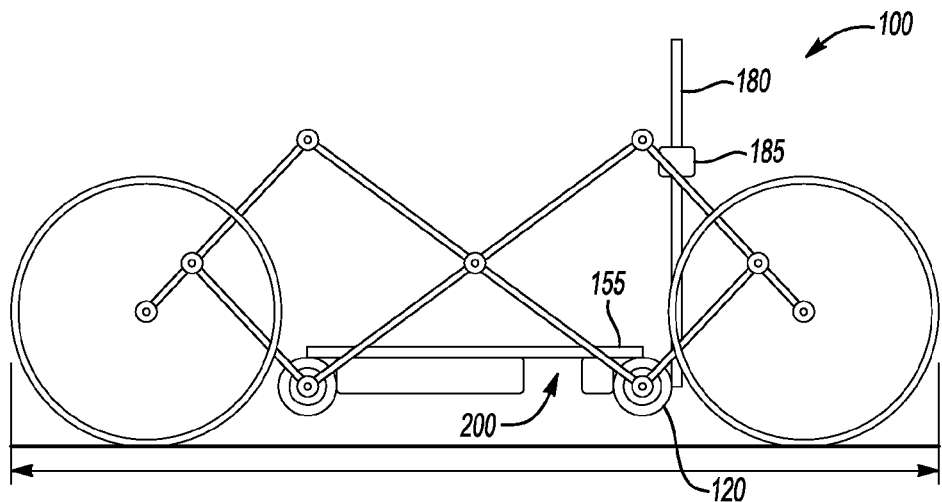
FIGS. 7E and 7F are stick diagrams showing a second example latching mechanism with the vehicle in open and closed positions, respectively.
Figure 7F:
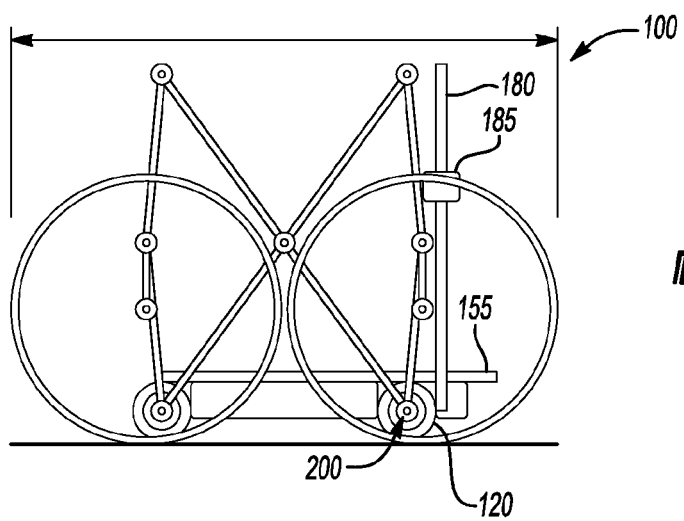

FIGS. 7E and 7F show vehicles 100 with the sliding vertical member 180 of FIG. 7B and the sliding floor structure 155 of FIGS. 7C and 7D. The down stop 185 of the vertical member 180 may be configured to restrain the vehicle 100 in the extended position while the floor structure 155 may be configured to prevent the vehicle structure 105 from folding on impact. The slot 200 may be configured to hold the vehicle 100 in the folded position. In some implementations, the latches described above may be omitted and the vehicle 100 may be folded or extended by, e.g., lifting the rear end of the floor 155.

Figure 8:
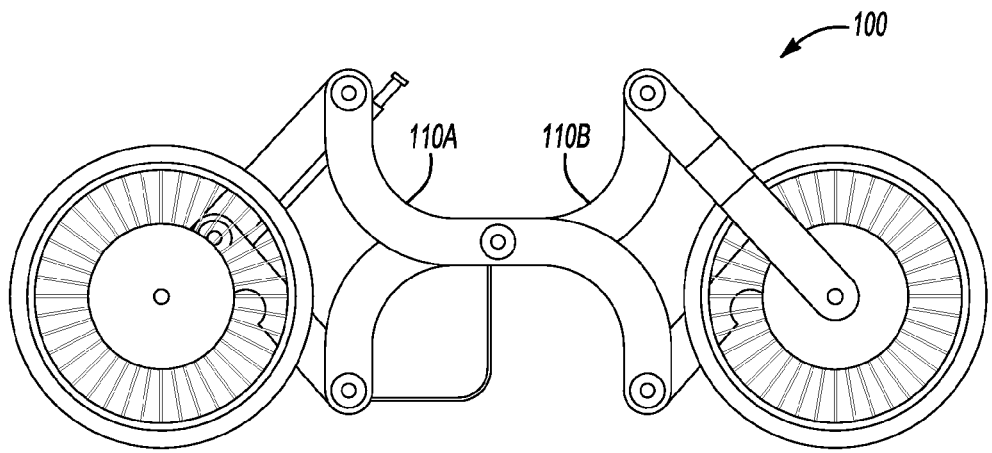
FIG. 8 illustrates an example vehicle having curved cross-members.

Referring now to FIG. 8, some cross-members 120 may be curved in the side view to improve ingress/egress of the driver and passenger, and can also be swept in the front view to improve aesthetic appearance, without affecting vehicle 100 function or folding. Moreover, the X-members need not be co-planar for the folding geometry to function.

Figure 9A:
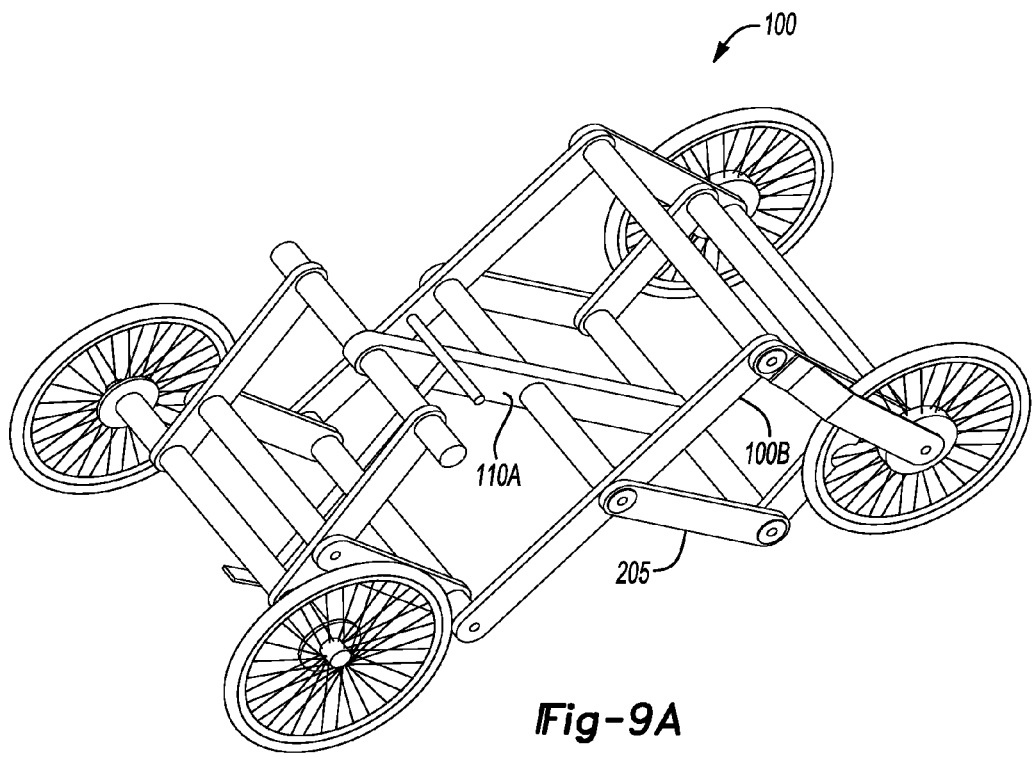
FIGS. 9A, 9B, and 9C illustrate an example vehicle having straight cross-members in a perspective view, a side view, and a top view, respectively.
Figure 9B:
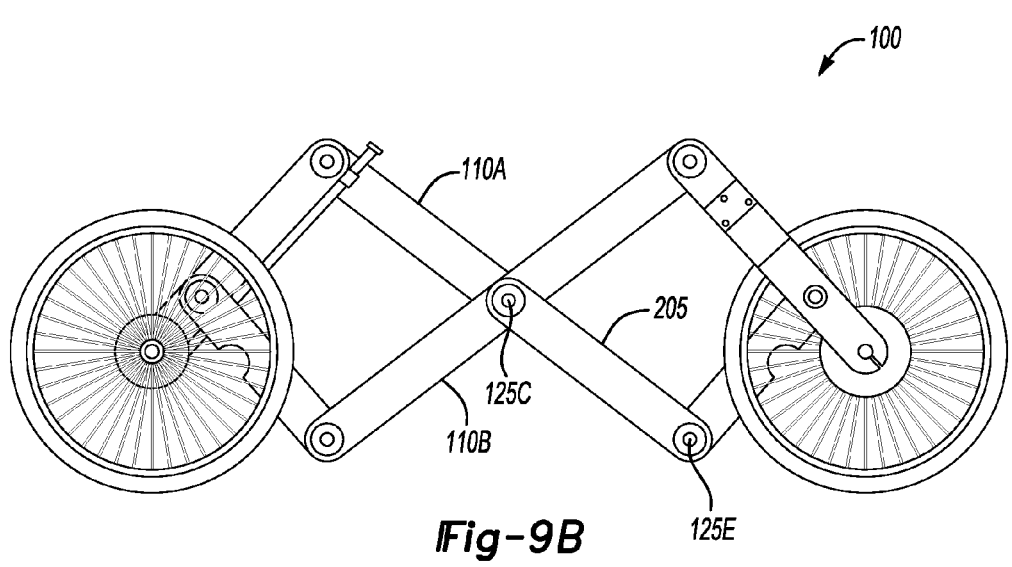
Figure 9C:
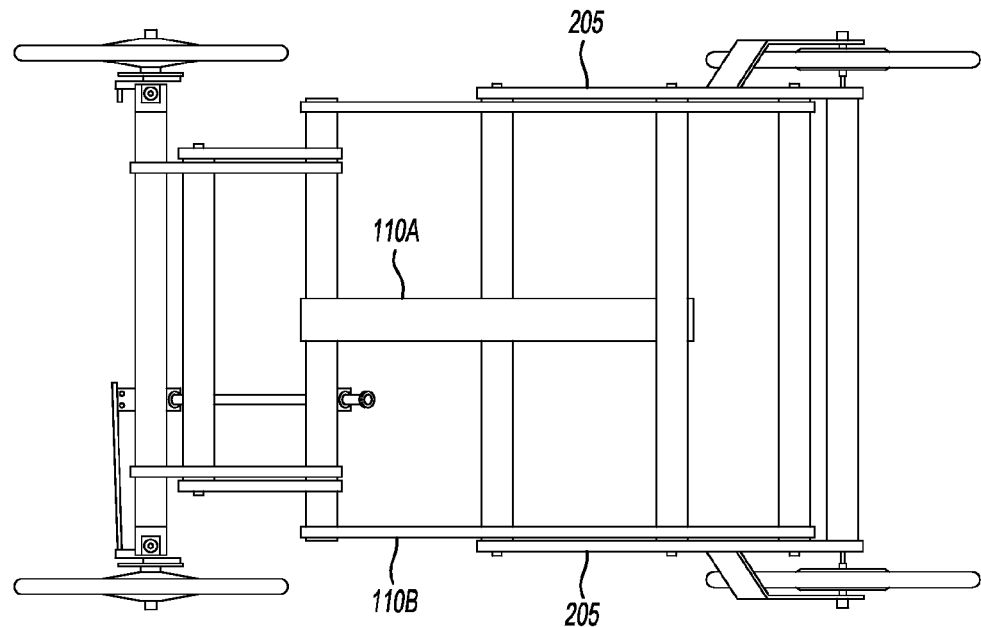

FIGS. 9A-9C illustrate a vehicle structure 105 with a member 110A moved to the center of the vehicle 100. Additional outboard links 205 between pivots 125C and 125E may be configured to add stability to the structure 105. This arrangement may allow for a more car-like ingress and egress feel for the occupants as they need not climb over an outboard member 110A to enter or exit the vehicle 100. Other non-planar arrangements of the X-members are possible.

Figure 10A:
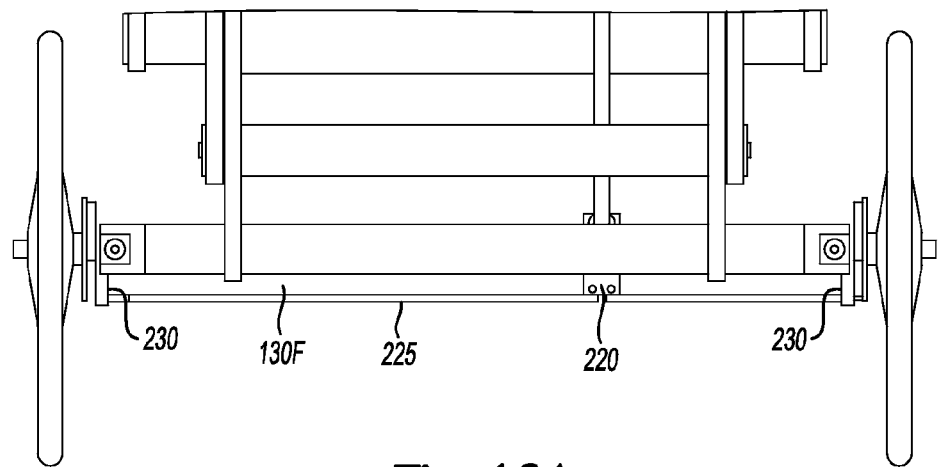
FIGS. 10A and 10B illustrate views of an example steering column and bell crank linkage.
Figure 10B:
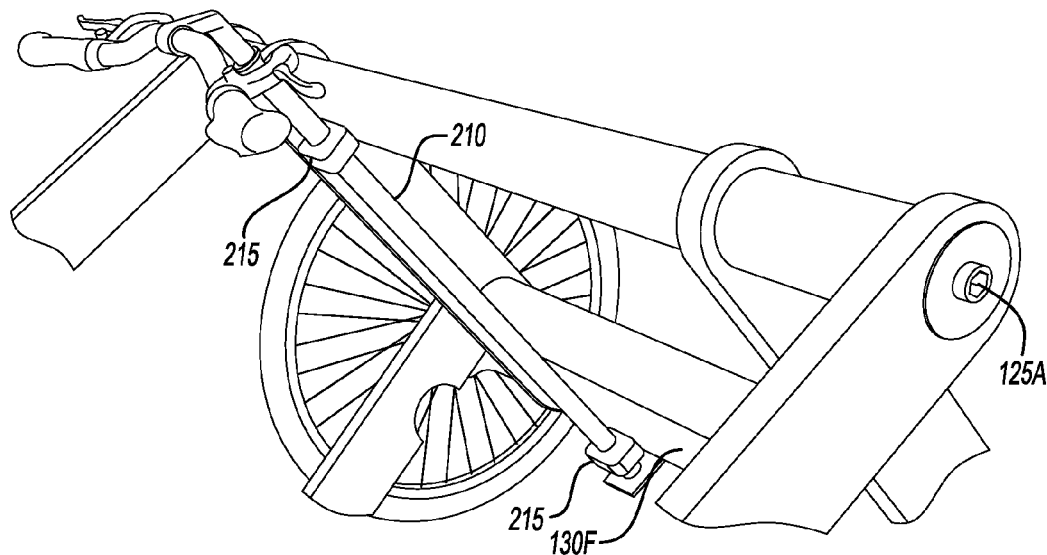

FIGS. 10A and 10B illustrate an example steering mechanism. The steering mechanism may include, e.g., a bell-crank, a rack & pinion system, or the like. The bell-crank system shown in FIGS. 10A and 10B includes a steering column 210 configured to fold along with the vehicle structure 105. The steering column 210 may be attached to the cross-member 120 between the pivot 125A and front axle 130A through pivot blocks 215. Thus the steering column 210 may be configured to move with the upper link and cross-member 120 assembly as the vehicle 100 is folded. The bell crank 220 may be attached to the end of the steering column 210. Tie rods 225 may be connected to steering arms 230 that are part of the steering knuckles. Right- or left-hand steering can be accommodated by, e.g., moving the pivot blocks 215 and reversing the bell crank 220 linkage.

Figure 11A:
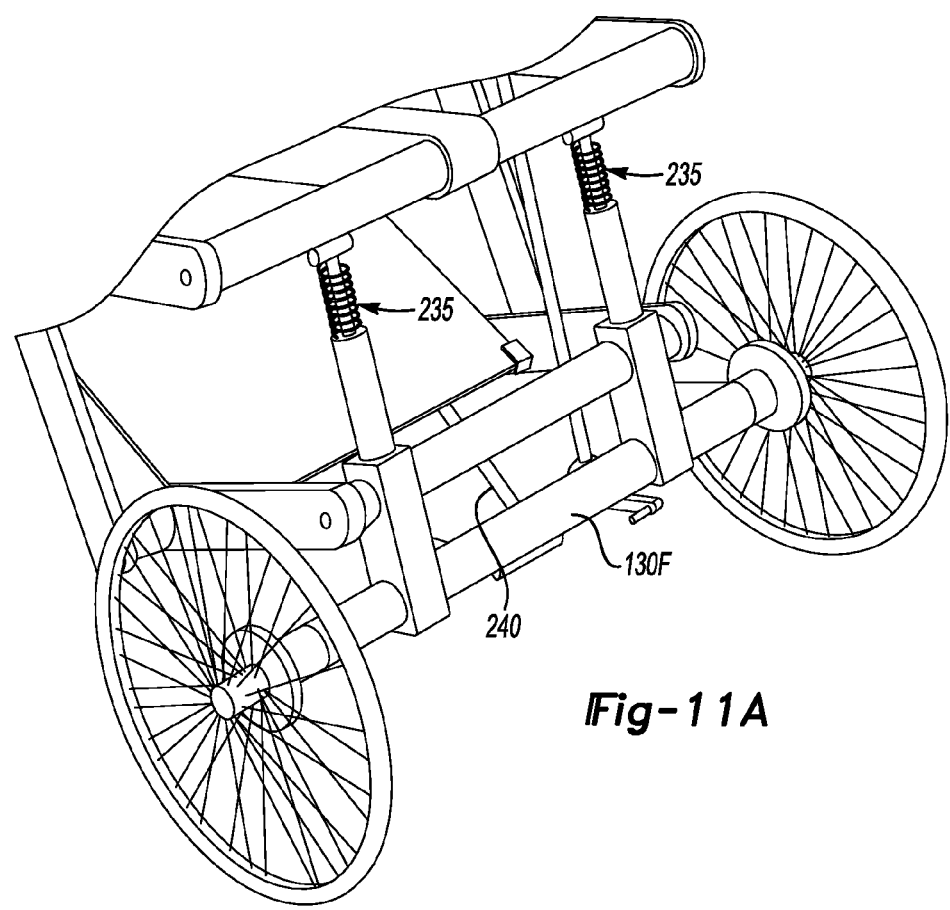

FIGS. 11A and 11B depict a possible front suspension arrangement for, e.g., rough road capability. As shown, the upper members 110 may be replaced by coil-over shocks 235 and the lower members 110 may be replaced by a triangular control arm 240 that attaches the pivots 125B to the front axle 130F. The steering mechanism, shown in FIGS. 10A and 10B, may be attached to the axle 130 with suspension motion accommodated by a splined and U-jointed intermediate shaft to the steering column 210. Another optional suspension arrangement may be configured for the rear axle 130R with upper members 110 replaced by coil-over shocks 235 and lower members 110 replaced by a triangular control arm 240 that attaches the pivots 125E to the rear axle 130R. Another potential suspension system may include transverse front and rear leaf springs with solid axles 130.

FIGS. 12A and 12B show a vehicle 100 having controlled vertical compression when, e.g., the vehicle 100 encounters rough roads. The vehicle 100 includes an extension spring 245 and/or shock 235 in the horizontal cable 250/member 110 or compression spring 245 and/or shock 235 in the vertical member 180. Rough road inputs can be absorbed by vertical compression of the vehicle structure 105 through various pivots 125.

Figure 13:
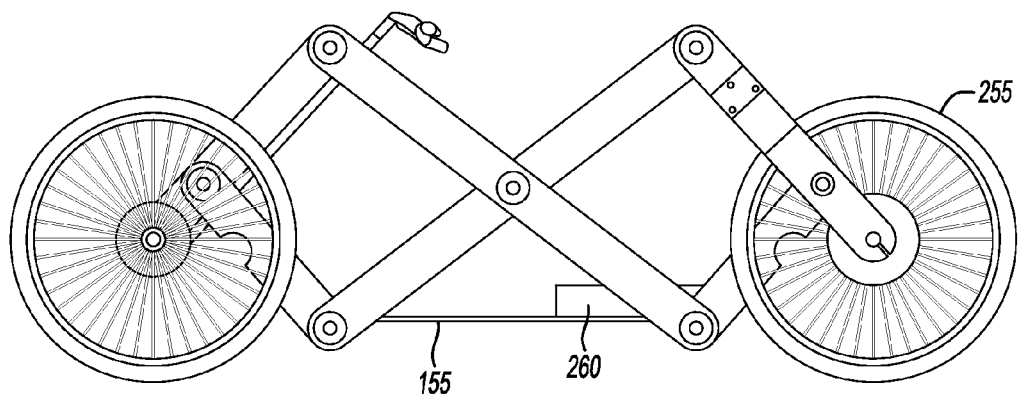
FIG. 13 is a side view of an example vehicle having a powertrain with a motor and a battery.

FIG. 13 depicts one of the many possible powertrain arrangements. Both internal combustion and electric power arrangements can be accommodated. In the arrangement depicted, drive is delivered by two rear electric hub motors 255 mounted within the wheels 135; however, a conventional rear axle 130R with a single electric motor 255 and differential is one of the many other possibilities. At least one removable battery 260 may be disposed in the vehicle 100, such as mounted on the floor 155. Multiple removable batteries may be electrically connected in parallel to increase the range of the vehicle 100, and the batteries may be removable so that they can be carried into the home for charging or easily swapped with freshly charged batteries.

Figure 14A:
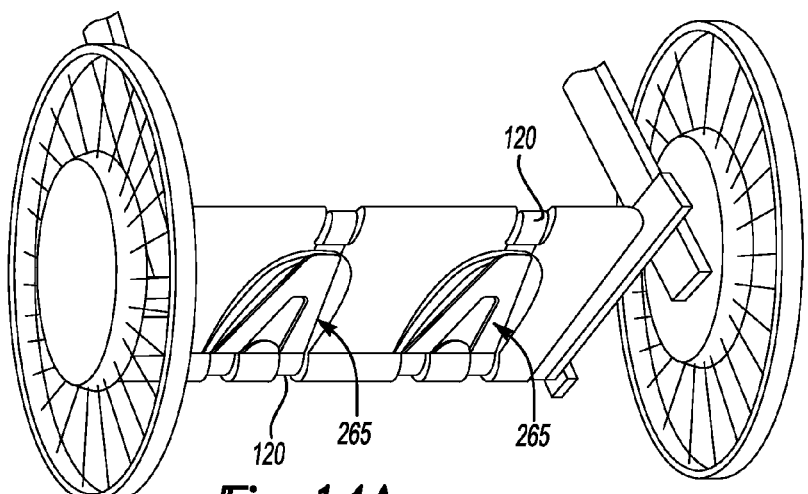
FIGS. 14A and 14B illustrate example removable battery packs.
Figure 14B:
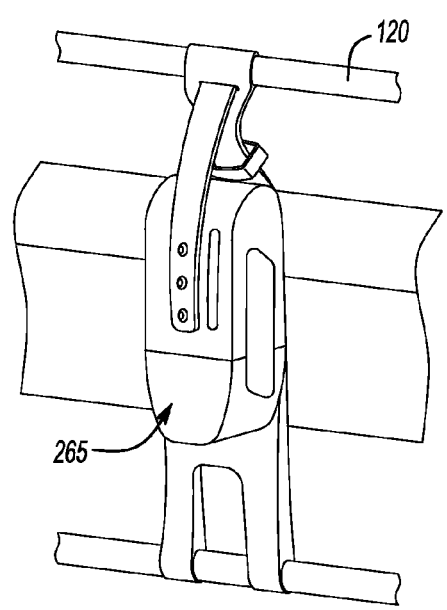

An example removable battery pack 265 is shown in FIGS. 14A and 14B. The removable battery pack 265 may allow an operator to carry the battery 260 for, e.g., security, remote charging, or both. In some possible implementations, the removable battery pack 265 may be configured to attach to cross-members 120 located, e.g., behind one of the seats 115.

The vehicle 100 can incorporate any number of powertrain, drive, and passenger configurations. Examples of powertrain configurations, as discussed above, may include internal combustion, electric, or hybrid. Examples of drive configurations may include front wheel drive, rear wheel drive, or all wheel drive configurations. Moreover, as discussed above, the vehicle 100 may include a suspension system. Examples of passenger configurations may include a single passenger configuration, a single passenger pick-up configuration, a 2-passenger tandem configuration, a 2 passenger abreast configuration, a 4-passenger/2-abreast configuration, a 6-passenger/3-abreast configuration, a 2-passenger/2-abreast/pick-up configuration, a 3-passenger/3-abreast/pick-up configuration, etc.

FIGS. 15A and 15B illustrate different views of an example 4-passenger model of the vehicle 100. Through the addition of more X-members plus additional cross-members 120, the 4-passenger model can be created from the simplistic 2-passenger model discussed above. As shown, the 4-passenger vehicle 100 is shown with optional front hub motors 255 to give the vehicle 100 all wheel drive functionality.

Figure 16A:
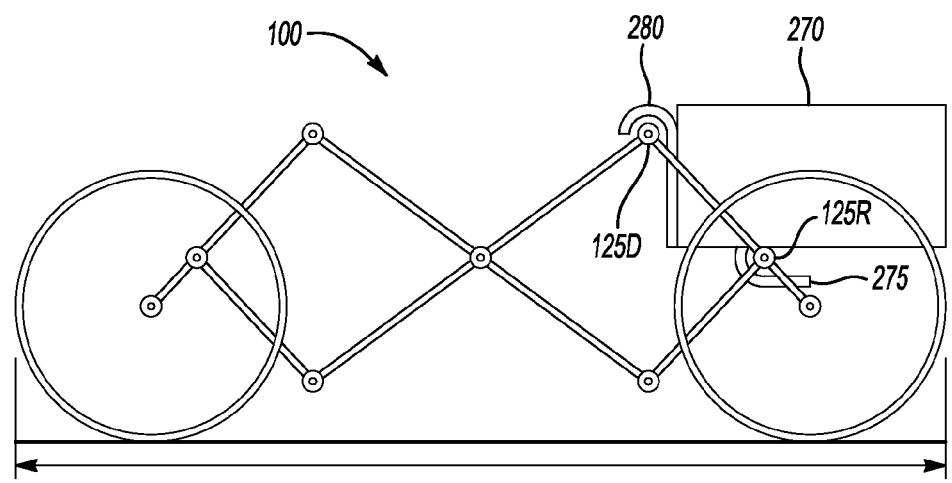
FIGS. 16A and 16B are stick diagrams showing an example 2-person vehicle with a pick-up bed in open and closed positions, respectively.
Figure 16B:
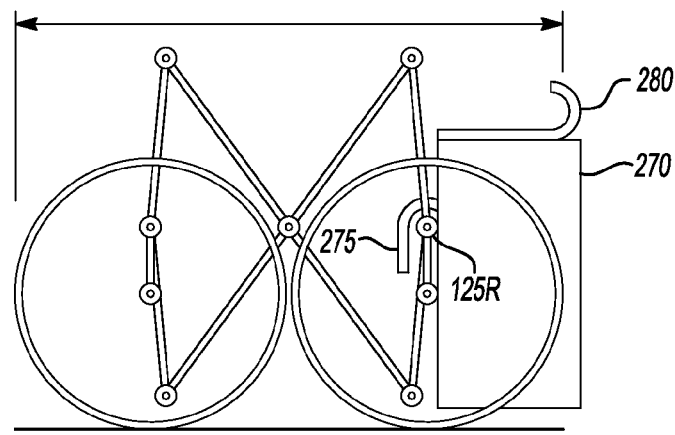

The vehicle 100 can be fitted with an optional, e.g., 2-foot pick-up box 270 as shown in FIGS. 16A and 16B for transport of light duty goods. While a 2-passenger vehicle 100 is shown in FIGS. 16A and 16B, the pick-up box 270 could also be applied to other vehicle 100 configurations, including the 4-passenger model, as discussed below with reference to FIGS. 17A and 17B. The pick-up box 270 may be connected via, e.g., the hook 275 to one cross-member 120 and latched to another cross-member 120D. When the latch 280 is released, the pick-up box 270 may be configured to pivot about pivot 125R so that the folded length of the vehicle 100 can remain relatively unchanged. The pick-up box 270 may be configured to easily detach when the operator desires to remove the pick-up box 270 from the vehicle 100.

Referring now to FIGS. 17A and 17B, the rear seats 115 of a 4-passenger model vehicle 100 may be removed, and a 4-foot box 270 may be added, resulting in a 2-passenger pick-up. The box 270 may be attached (i.e., hooked) to the cross-member 120R and latched to the cross-member 120D. The box 270 may be configured to pivot to a dump position by, e.g., releasing the latch 280 and power folding the vehicle 100 such that the cross-member 120R slides forward to engage the front hook 285, allowing the box 270 to rotate about the cross-member 120R. The dump position may further permit the vehicle 100 to be parked in a folded condition for cramped environments. The pick-up box 270 may installed or removed by engaging or disengaging, respectively, the latch 280 and hooks 275.

The vehicle 100 may be further modified to comply with various safety, regulatory, and customer needs. Safety and regulatory features may include windshield, wipers, fenders, seatbelts, headlights, taillights, turn signals, mirrors, ignition key, reflectors, 4-wheel brakes, a parking brake, etc.

Figure 18A:
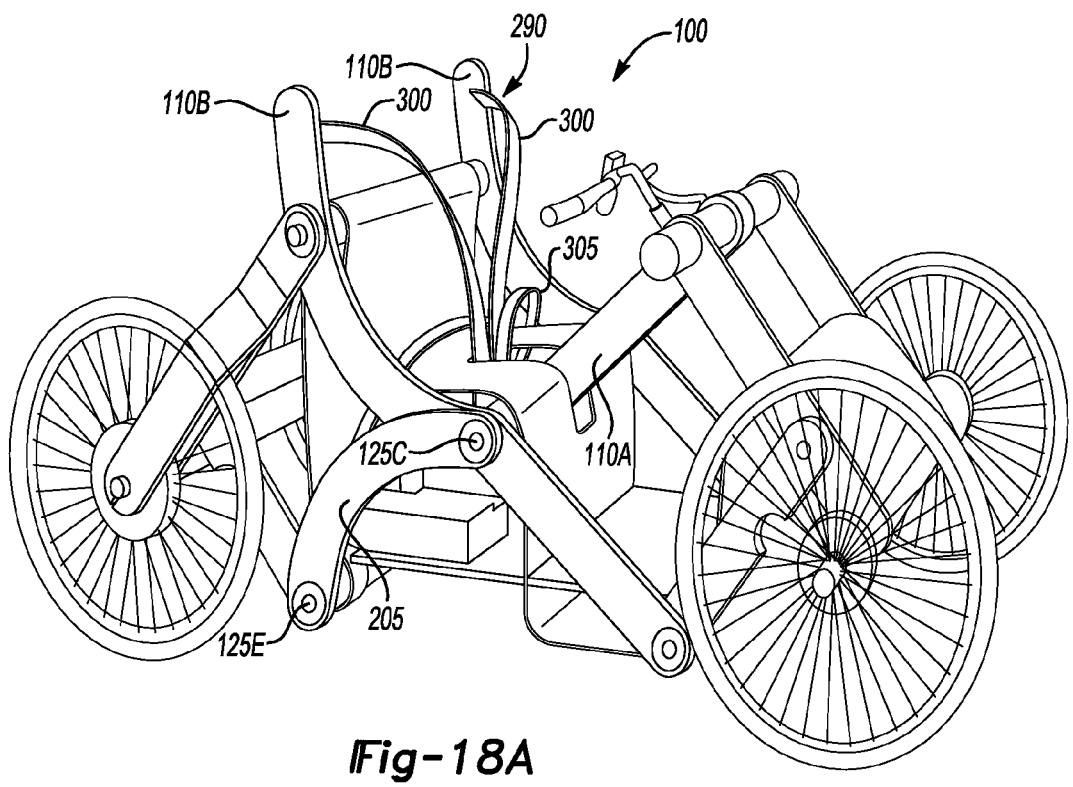
FIGS. 18A and 18B are perspective views of an example seatbelt mechanism.
Figure 18B:
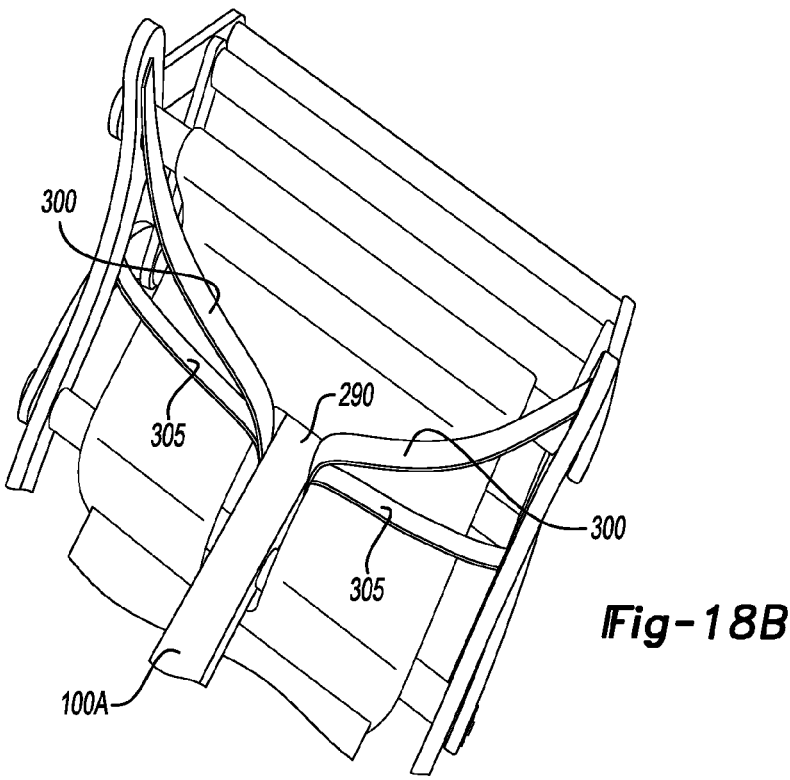

FIGS. 18A and 18B illustrate a vehicle 100 having a 3-point harness 280 to the implementation illustrated in FIGS. 9A-9C. The 3-point harness 280 may be installed by attaching belt buckle receivers 295 to the member 110A. The rear of the members 110B may be extended vertically to attach shoulder belts 300 while the lap belts 305 may be attached to the members 205 between pivots 125C and 125E. A similar arrangement can be used with the parallel X-frame structure 105 illustrated in FIG. 1. In that case, the member 205 between the pivots 125C and 125E may be mounted centrally to provide an attachment for the belt buckle receivers 295.

Figure 19A:
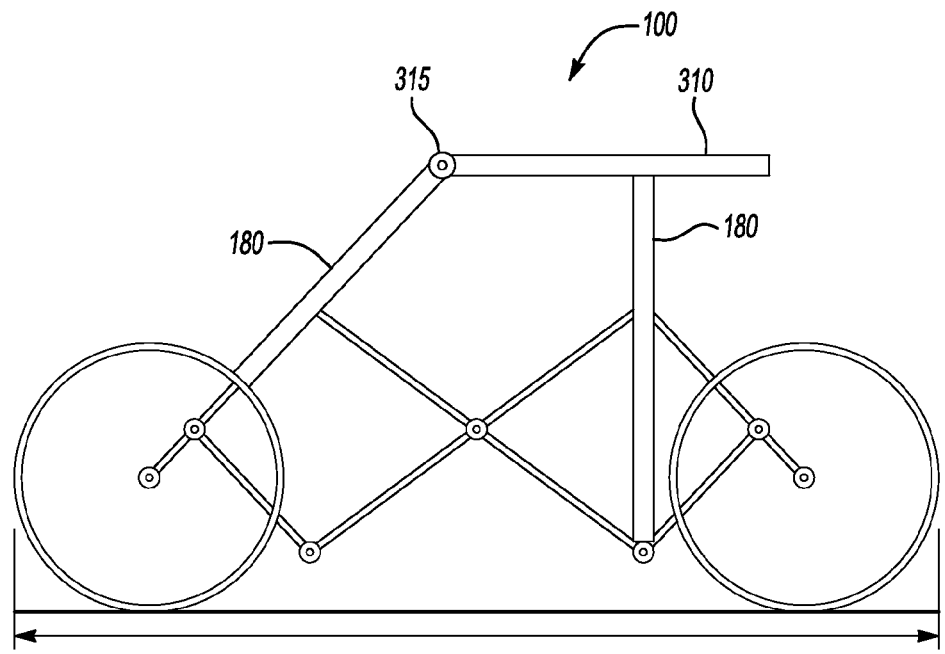
FIGS. 19A and 19B are stick diagrams showing an example vehicle, with a sliding roof, in an open and closed position, respectively.
Figure 19B:
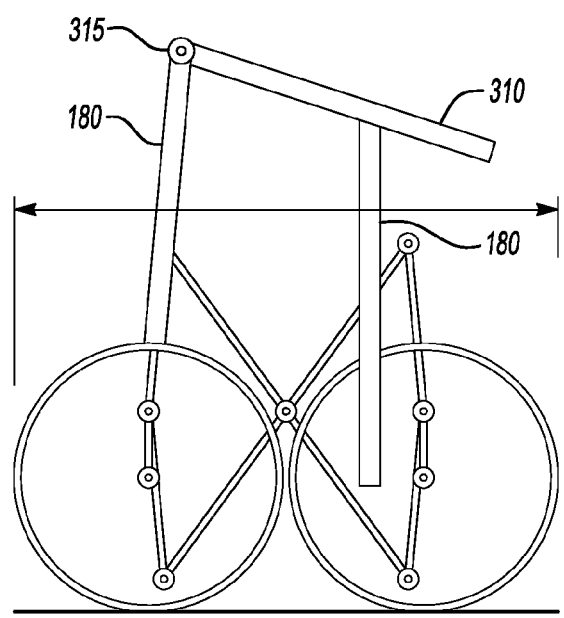

Customer customization options may include various types of weather protection and storage features such as a rigid roof 310, flexible canopy top 320, front and rear valences 330, fabric side panels 335, storage basket 355, a sling trunk 350, zip-out doors, and scissor doors 340. An optional hard roof 310, shown in FIGS. 19A and 19B, may allow the vehicle 100 to fold by pivoting along one vertical member 180 and sliding along another vertical member 180, similar to the sliding floor 155 described above. The vertical members 180 (previously discussed with reference to FIG. 7B) may be extended vertically and connected cross-car in order to provide a sliding roof 310 support. The roof 310 may be hinged to the windshield header 315 to allow a rigid roof 310 to slide rearward relative to the orientation of the vehicle 100 as the structure 105 is folded.

Figure 20A:
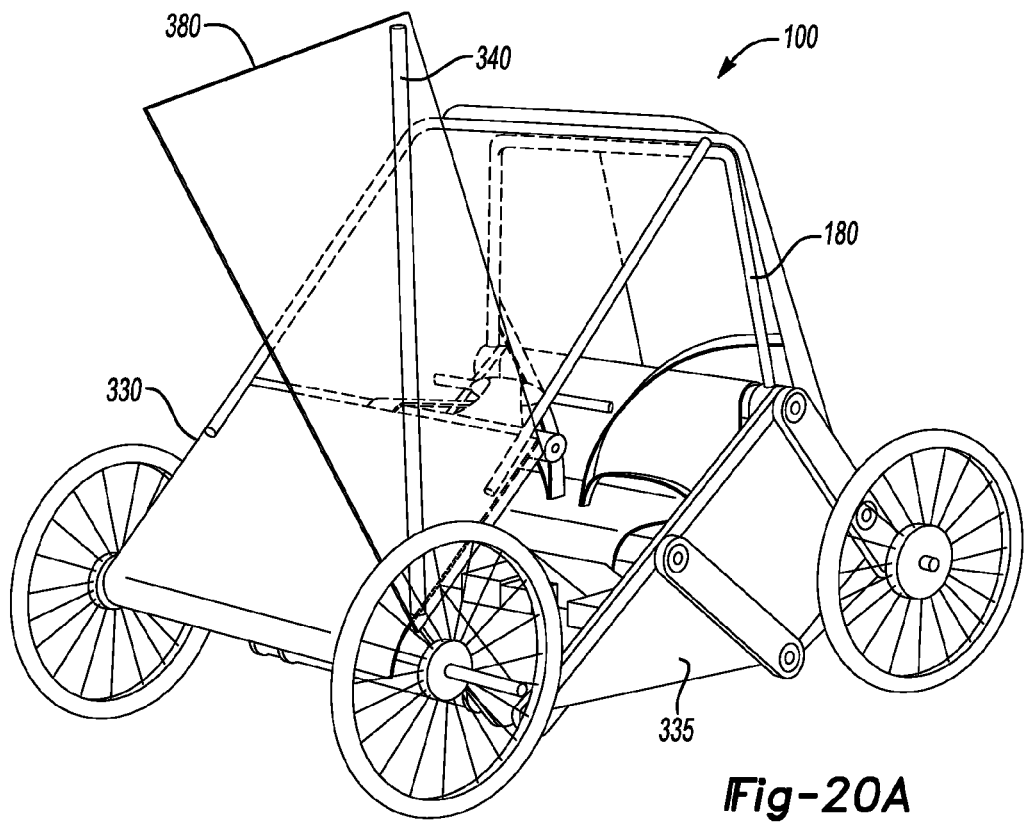
FIGS. 20A and 20B are perspective views of an example vehicle having a cover.
Figure 20B:
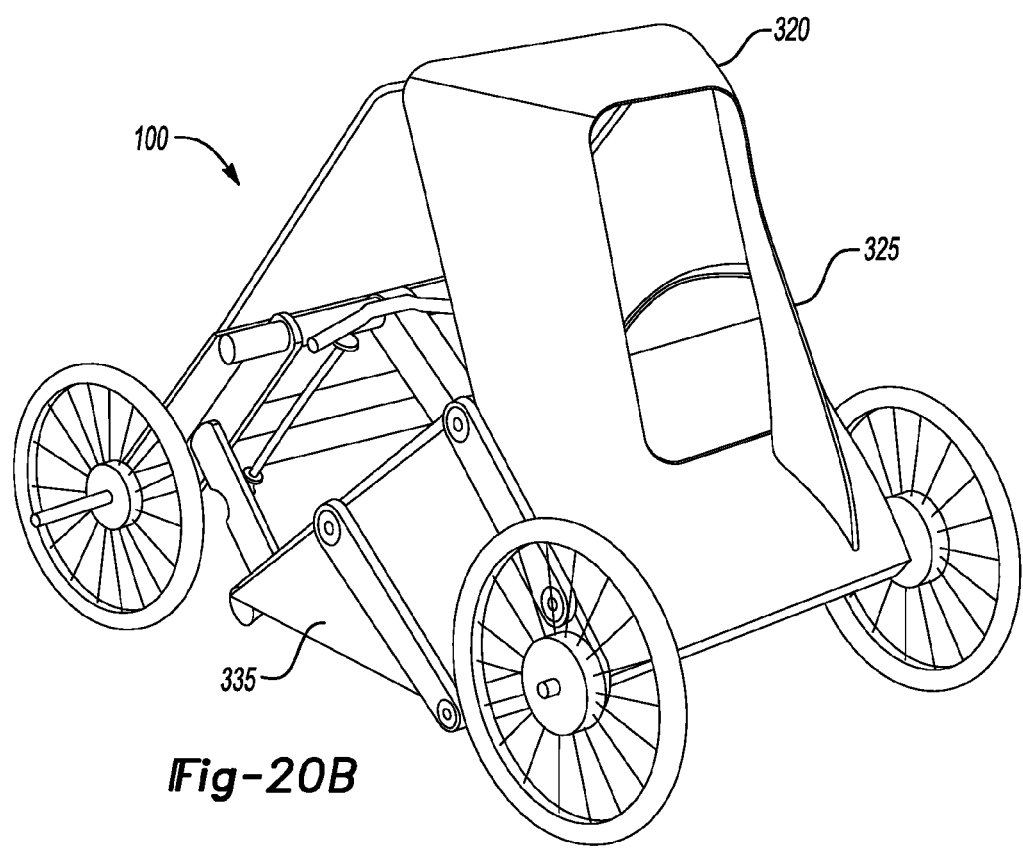
Figure 21A:
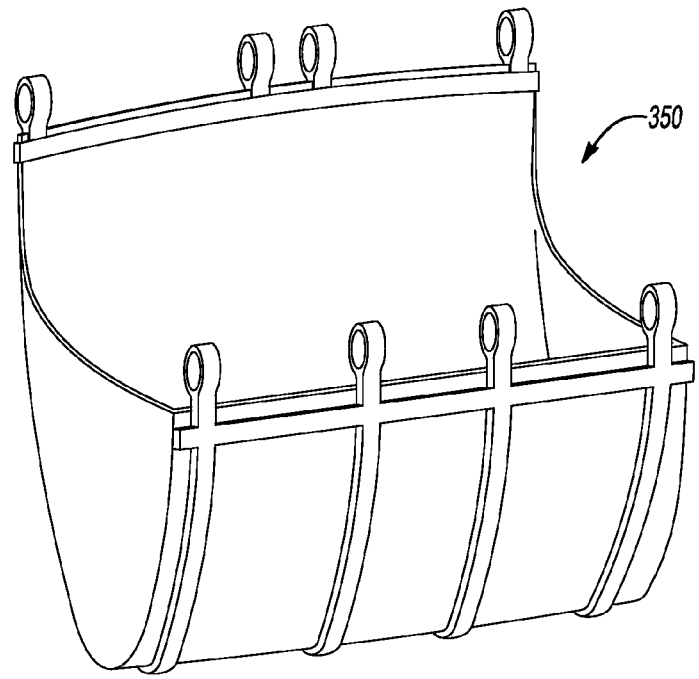
FIGS. 21A and 21B illustrate a first example storage trunk alone and located in the vehicle, respectively.
Figure 21B:
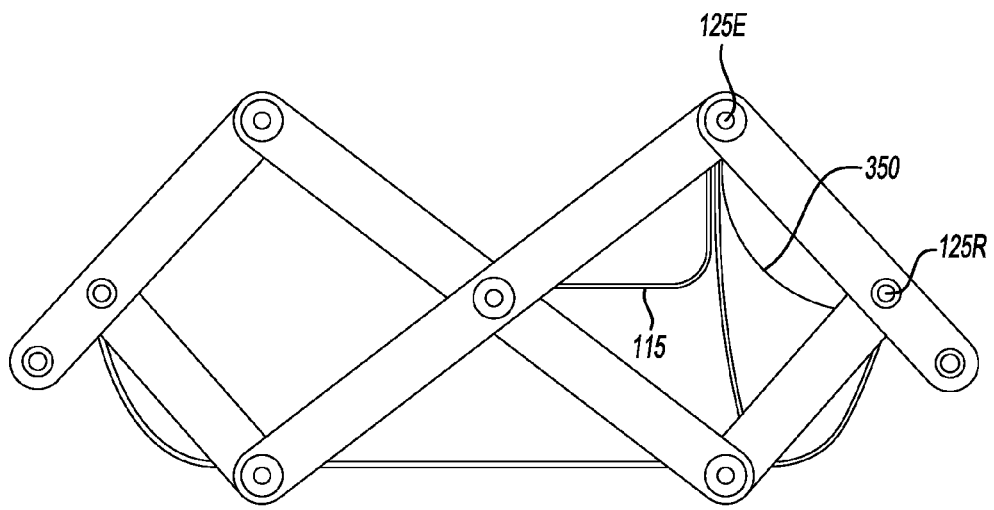
Figure 21C:
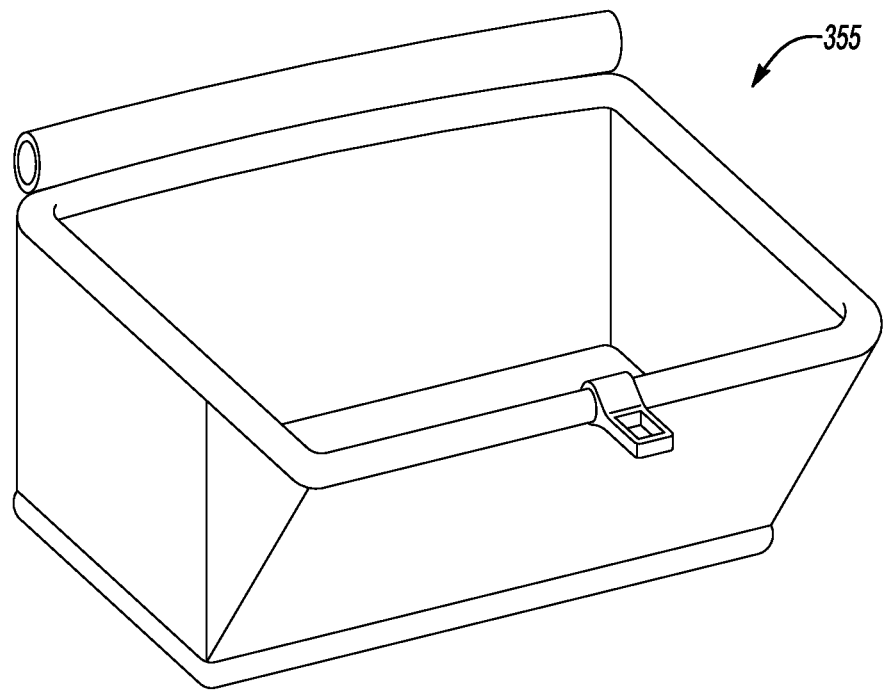
FIGS. 21C and 21D illustrate a second example storage trunk alone and located in the vehicle, respectively.
Figure 21D:
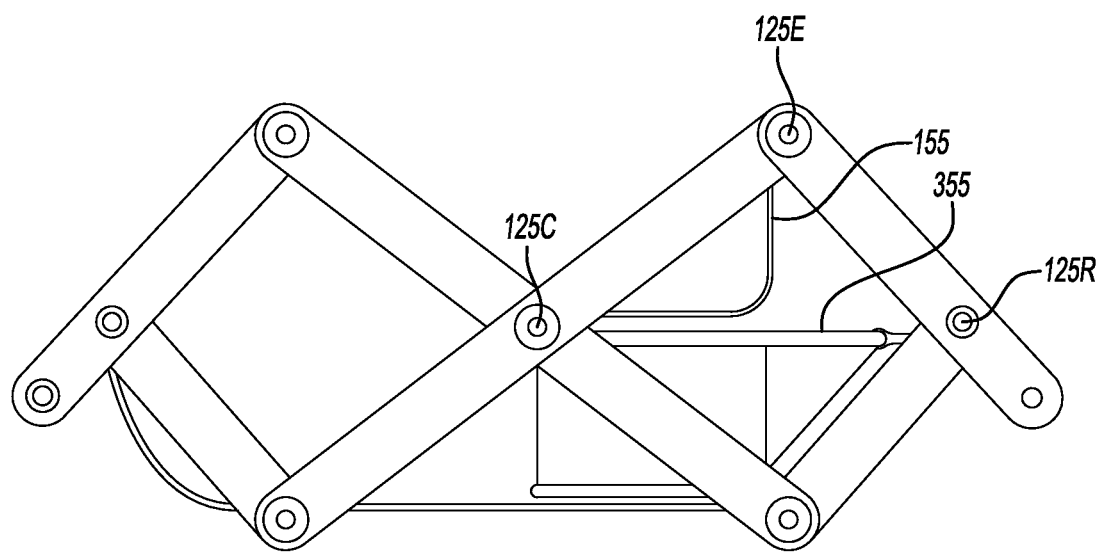
Figure 22A:
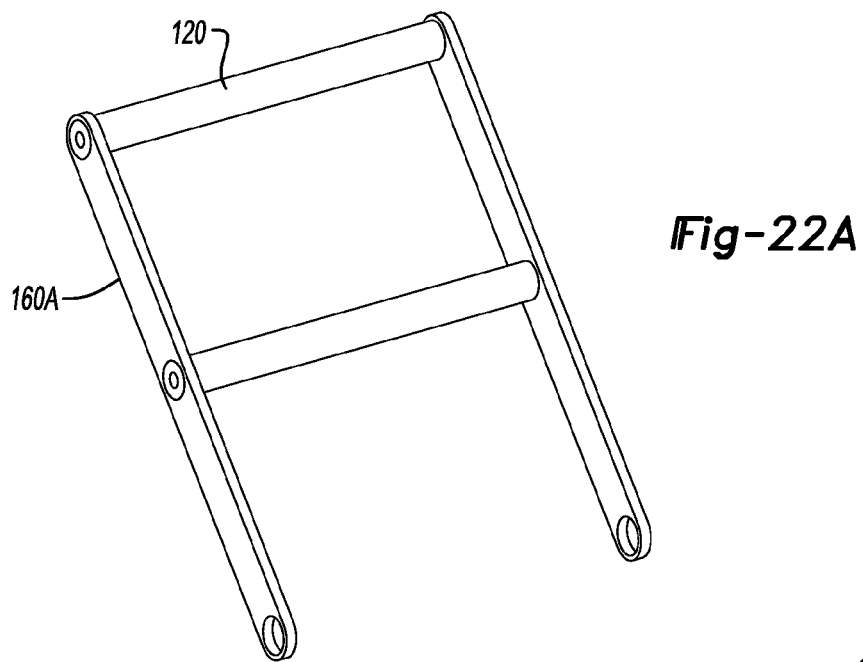
FIGS. 22A-22F illustrate components of an example vehicle collapsed for storage or shipping.
Figure 22B:
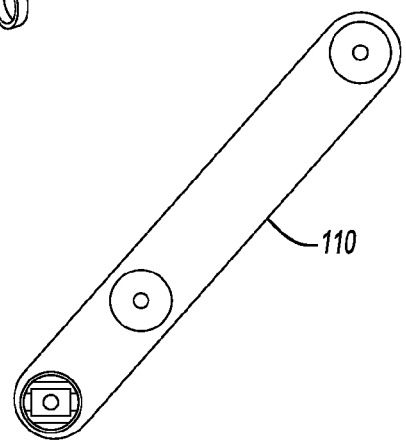
Figure 22C:
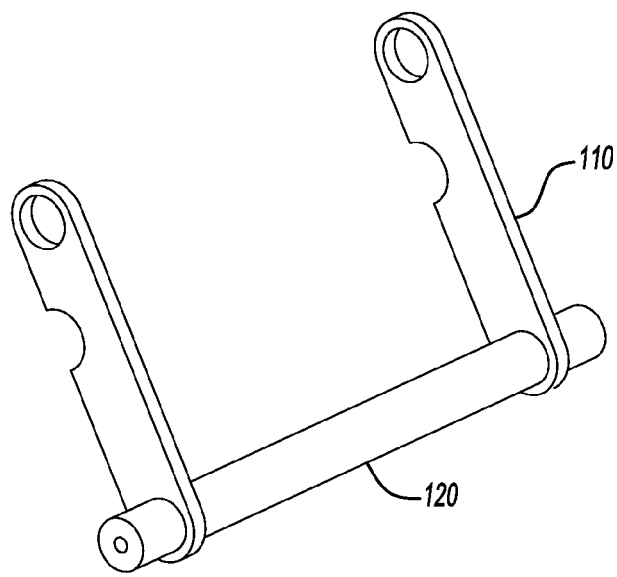
Figure 22D:
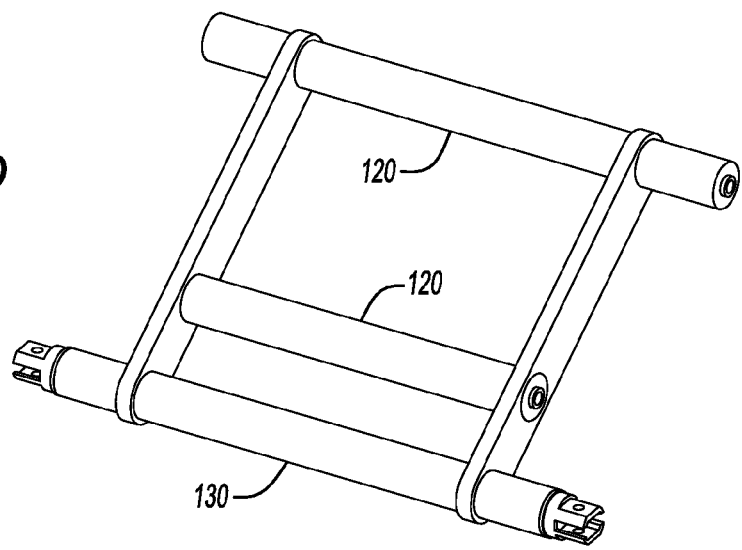
Figure 22E:
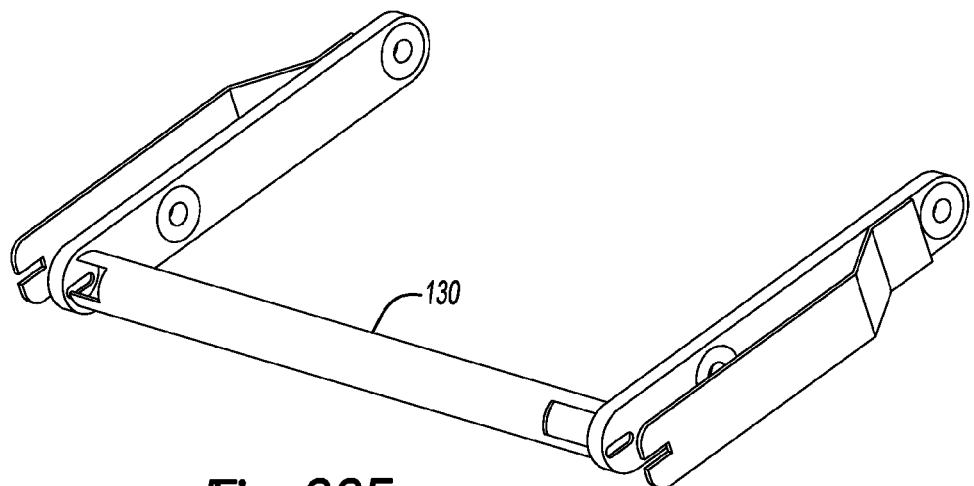
Figure 22F:
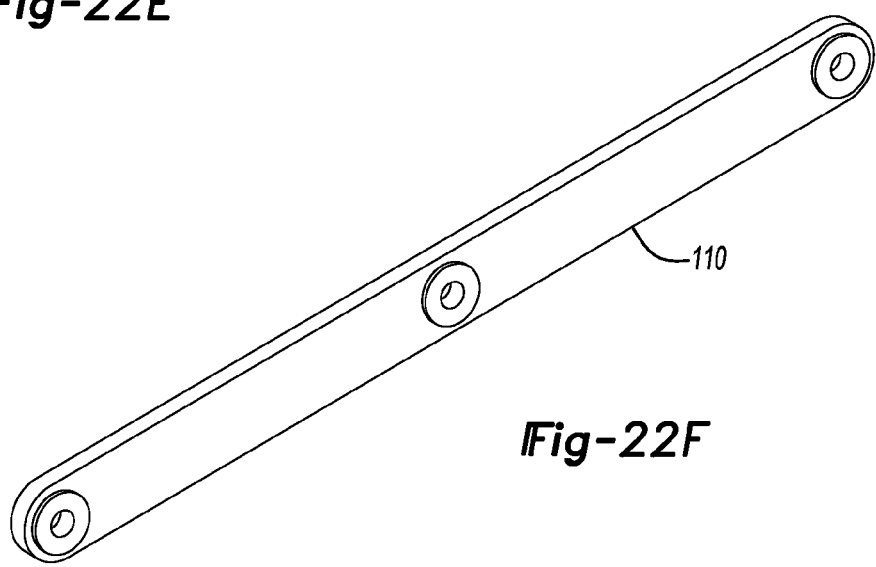

FIGS. 20A and 20B illustrate other weather protection customizations. A canopy top 320 may be attached to the windshield header and may be supported by the roof support 180 described above. A bottom of the canopy may be attached to the members 110E and rear axle 130R through snaps or other types of connectors. A zip out backlite 325 may be configured to provide storage access. A front valence 330 may be formed from a rigid panel or waterproof fabric. Side panels 335 may be formed from a 4-way stretch fabric, such as an elastic polyurethane fabric (e.g., LYCRA), and may be attached to the pivots 125. Scissor doors 340 made of a polycarbonate material, like LEXAN, may be mounted to a door beam 345 configured to swing about the pivot 125A or 125F and latch to the pivot 125C or 125D. The vehicle 100 may be configured to fold when the doors are in the open position.

Another customization may relate to additional storage options, including storage compartments. FIGS. 21A-21D illustrates various views of a sling 350 (FIGS. 21A and 21B) and an under-seat expanding basket 355 (FIGS. 21C and 21D) that may be used as storage options. The sling 350 may be configured to be attach to a cross-member 120 extending behind one of the seats 115. The expanding basket 355 may be configured to rest on a floor 155 under or behind one of the seats 115. The storage compartments 350, 355 may be formed from a rigid or flexible material.

Referring now to FIGS. 22A-22F, the vehicle structure 105 may be made up of multiple flat plane assemblies. Therefore, for purposes of packaging and shipping, the vehicle 100 can be packed in a flat, partially assembled state, along with the wheels 135. This results in a very compact package that can be efficiently shipped around the world. FIGS. 22A-22F illustrate example combinations of parts of the vehicle 100 that may be combined for purposes of packaging and shipping the vehicle 100.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A folding vehicle structure comprising:
   a frame having a first member, a second member intersecting the first member at a first pivot point, a third member spaced from the first and second members, and a fourth member spaced from the first and second members, wherein the fourth member intersects the third member at a second pivot point;
   a seat disposed on the frame,
   wherein the frame includes a first cross-member extending from the first pivot point to the second pivot point and a second cross-member extending parallel to and spaced from the first cross-member,
   wherein each of the first member, the second member, the third member, and the fourth member terminate at terminal pivot points, and wherein the terminal pivot points of the first member are coaxially aligned with the terminal pivot points of the third member and wherein the terminal pivot points of the second member are coaxially aligned with the terminal pivot points of the fourth member,
   wherein the second cross-member extends between the terminal pivot points of the first member and the third member, and wherein the seat is at least partially disposed on the second cross-member.

2. The folding vehicle structure of claim 1, wherein the first member and the second member are rotatable about the first pivot point and the third member and the fourth member are rotatable about the second pivot point to collapse or expand the frame.

3. The folding vehicle structure of claim 1, further comprising a plurality of wheels disposed on the frame, wherein the frame collapses by driving at least one wheel toward at least one other wheel.

4. The folding vehicle structure of claim 1, wherein the first member, the second member, the third member, and the fourth member are substantially straight.

5. The folding vehicle structure of claim 1, wherein at least one of the first member, the second member, the third member, and the fourth member is curved.

6. The folding vehicle structure of claim 1, wherein the seat is disposed on the first cross-member and the second cross-member.

7. The folding vehicle structure of claim 1, wherein the seat is formed from a rigid material.

8. The folding vehicle structure of claim 1, wherein the seat is formed from a flexible material.

9. The folding vehicle structure of claim 1, wherein the frame includes a front axle and a rear axle.

10. The folding vehicle structure of claim 9, wherein the frame includes a suspension system operably connected to at least one of the front axle and the rear axle.

11. The folding vehicle structure of claim 9, further comprising a steering system operably connected to at least one of the front axle and the rear axle.

12. The folding vehicle structure of claim 1, further comprising a floor structure disposed on the frame.

13. The folding vehicle structure of claim 12, wherein the floor structure is collapsible.

14. The folding vehicle structure of claim 12, wherein the floor structure is slideable from a first position to a second position when the frame is collapsed.

15. The folding vehicle structure of claim 1, further comprising a roof structure disposed on the frame.

16. The folding vehicle structure of claim 1, wherein the roof structure is collapsible.

17. The folding vehicle structure of claim 16, wherein the roof structure is slideable from a first position to a second position when the frame is collapsed.

18. The folding vehicle structure of claim 1, wherein the first cross-member is coaxially aligned with the first pivot point and the second pivot point.

19. The folding vehicle structure of claim 18, further comprising a third cross-member extending between the second member and the fourth member, wherein the third cross-member is coaxially aligned with one of the terminal pivot points of the second member and one of the terminal pivot points of the fourth member, and wherein the first cross-member, the second cross-member, and the third cross-member are parallel to one another.

* * * * *